(12) United States Patent
Bentley et al.

(10) Patent No.: US 11,151,282 B2
(45) Date of Patent: *Oct. 19, 2021

(54) SYSTEM AND METHOD USING A DATABASE FOR ENHANCED USER INITIATED REQUESTS OF MATERIAL OR INFORMATION

(71) Applicant: United States Postal Service, Washington, DC (US)

(72) Inventors: Daniel Mark Bentley, Washington, DC (US); Robert E. Dixon, Jr., Washington, DC (US); Ryan M. Luckay, Washington, DC (US)

(73) Assignee: United States Postal Service, Washington, DC (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/666,153

(22) Filed: Oct. 28, 2019

(65) Prior Publication Data

US 2020/0065518 A1 Feb. 27, 2020

Related U.S. Application Data

(63) Continuation of application No. 15/392,473, filed on Dec. 28, 2016, now Pat. No. 10,460,127.
(Continued)

(51) Int. Cl.
*G06F 21/62* (2013.01)
*G06F 16/22* (2019.01)
(Continued)

(52) U.S. Cl.
CPC ........ *G06F 21/6245* (2013.01); *G06F 3/0481* (2013.01); *G06F 16/2282* (2019.01);
(Continued)

(58) Field of Classification Search
CPC ............. G06F 3/04817; G06F 16/9535; G06F 21/6254; G06F 3/0481; G06F 16/2379;
(Continued)

(56) References Cited

U.S. PATENT DOCUMENTS 5,999,912 A 12/1999 Wodarz et al.
8,380,563 B2 2/2013 Datar et al.
(Continued)

OTHER PUBLICATIONS

International Search Report and Written Opinion dated Mar. 24, 2017 in International Application No. PCT/US16/68827.
(Continued)

*Primary Examiner* — Shahid A Alam
(74) *Attorney, Agent, or Firm* — Knobbe Martens Olson & Bear LLP

(57) ABSTRACT

A method of providing material based on a user-initiated request utilizing an electronic database includes receiving search keywords to conduct a search and accessing a first database having previously stored contact information for the particular user in an initial table record. The method includes transforming data in the fields of the record for the particular user in the initial table to generate a record in a sanitized table, accessing a second electronic database having previously stored data structures corresponding to businesses, where each data structure maps selected keyword combinations to corresponding icons, and to particular material corresponding to each keyword combination, and displaying icons associated with search results having corresponding selected keywords near associated result items on an electronic display. The method includes initiating sending of particular material corresponding to the request based on the selected icon and contact data for the user obtained from the sanitized table.

20 Claims, 19 Drawing Sheets

Related U.S. Application Data

(60) Provisional application No. 62/272,597, filed on Dec. 29, 2015.

(51) Int. Cl.
*G06F 16/23* (2019.01)
*G06F 16/9535* (2019.01)
*H04L 29/08* (2006.01)
*G06F 21/42* (2013.01)
*G06F 3/0481* (2013.01)
*G06Q 10/10* (2012.01)
*G06F 3/0484* (2013.01)
*G06Q 50/00* (2012.01)
*H04L 29/06* (2006.01)

(52) U.S. Cl.
CPC ...... *G06F 16/2379* (2019.01); *G06F 16/9535* (2019.01); *G06F 21/42* (2013.01); *G06F 21/6227* (2013.01); *G06F 21/6254* (2013.01); *G06Q 10/107* (2013.01); *H04L 67/306* (2013.01); *G06F 3/04817* (2013.01); *G06F 3/04842* (2013.01); *G06Q 50/01* (2013.01); *H04L 67/42* (2013.01)

(58) Field of Classification Search
CPC .. G06F 21/42; G06F 21/6227; G06F 16/2282; H04L 67/42
USPC ............................................. 707/705; 705/14
See application file for complete search history.

(56) References Cited

U.S. PATENT DOCUMENTS

| | | | |
|---|---|---|---|
| 8,510,031 B2* | 8/2013 | Williams | ............... G06Q 40/12 701/400 |
| 8,515,968 B1 | 8/2013 | Bayardo et al. | |
| 8,819,029 B1 | 8/2014 | Bayardo et al. | |
| 2005/0256766 A1 | 11/2005 | Garcia et al. | |
| 2005/0278544 A1* | 12/2005 | Baxter | .................... G06F 21/79 713/182 |
| 2006/0149625 A1 | 7/2006 | Koningstein | |
| 2006/0195442 A1* | 8/2006 | Cone | ...................... G06Q 30/00 |
| 2007/0203906 A1* | 8/2007 | Cone | ................. G06F 16/90324 |
| 2008/0126178 A1* | 5/2008 | Moore | .............. G06Q 30/0201 705/7.29 |
| 2008/0288342 A1 | 11/2008 | Ingleshwar | |
| 2009/0083229 A1* | 3/2009 | Gupta | ..................... G06F 16/48 |
| 2009/0198579 A1 | 8/2009 | Lewis et al. | |
| 2010/0138401 A1 | 6/2010 | Simpson | |
| 2012/0331567 A1* | 12/2012 | Shelton | ................ G06Q 20/102 726/28 |

OTHER PUBLICATIONS

International Preliminary Reporton Patentability dated Jul. 3, 2018 in International Application No. PCT/US2016/068827.

* cited by examiner

| Name(First & Last) | |
|---|---|
| Street Address | |
| Street Address | |
| City | |
| State | |
| ZIP Code | |
| Email Address | |
| Phone Number | |
| Mobile Number | |
| Social Network Identification | |
| Social Network Names/Aliases | |
| Preferred Product, Service, or Information Ratings | |
|     In iconography or alphanumeric rating scales. | |
|     Unrated or new may be option as well. | |
| Terms of Use/Opt in Agreement | Accept/Save |
|     Lorem Ipsum.... | |

200 — The application user or internet or intranet user/searcher is presented with contact data fields and may also be presented with Ratings Preferences and/or Terms of Use/Opt In Agreement

FIG. 2

```
Name(First & Last)  [Alpha Numeric]
Street Address      [Alpha Numeric]
Street Address      [Alpha Numeric]
City                [Alpha Numeric]
State               [Alpha Numeric]
ZIP Code            [Alpha Numeric]
Email Address       [Alpha Numeric]
Phone Number        [Alpha Numeric]
Mobile Number       [Alpha Numeric]
Social Network Identification  [Alpha Numeric]
Social Network Names/Aliases   [Alpha Numeric]
Preferred Product, Service, or Information Ratings
    In iconography or alphanumeric rating scales.   310
    Unrated or new may be option as well.
                                            [Accept/Save]
Terms of Use/Opt in Agreement
    Lorem Ipsum....
```

The application user or internet or intranet user/searcher populates the contact data fields and/or Ratings Preferences and reviews Terms of Use/Opt In Agreement (if presented).

The application user or internet or intranet user/searcher would click the Accept/Save button or link.

SYSTEM AND METHOD USING A DATABASE FOR ENHANCED USER INITIATED REQUESTS OF MATERIAL OR INFORMATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 15/392,473, filed on Dec. 28, 2016, and claims the benefit of U.S. Provisional Application No. 62/272,597 filed on Dec. 29, 2015.

BACKGROUND

Field

Generally, the development is directed to providing material or information based on a user-initiated electronic request in a system including at least an electronic database.

Description of the Related Art

Online search providers such as Google, Bing and Yahoo provide a list of search results on a user's display device. The search results provide a brief description of the web page identified by each result and include a link to a uniform resource locator for the page.

SUMMARY

In certain embodiments, there is an enhanced user initiated request for material or information identifying a product via an internet or intranet application, web based plugin, or helper application which enables the seamless sharing of user contact data, rating preferences and terms of use (if required). This summary is provided to introduce the subject matter of using a database for enhanced user initiated requests for material or information, which is further described below in the Detailed Description. This summary is not intended to identify essential features of the claimed subject matter, nor is it intended for use in determining the scope of the claimed subject matter.

BRIEF DESCRIPTION OF THE DRAWINGS

FIG. 2 is an example screen display of data fields to be completed as displayed on a client machine.

FIG. 3 is an example screen display showing example field data types of the data fields shown in FIG. 2.

DETAILED DESCRIPTION OF A PREFERRED EMBODIMENT

Figure 1:
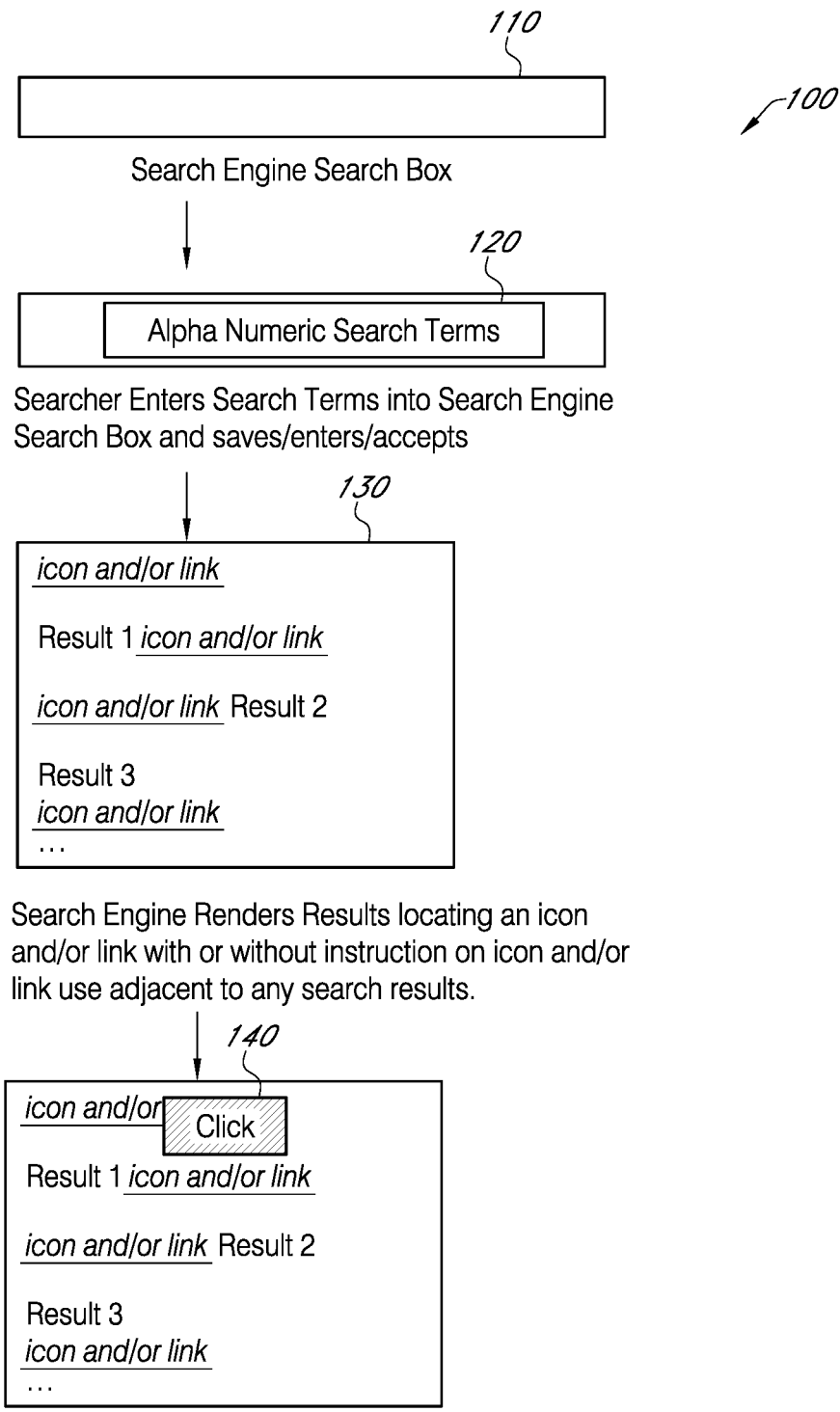
FIG. 1 is a flow diagram with example screen displays as displayed on a client machine in an example search term embodiment of the system and method.

The following detailed description is directed to certain specific embodiments of the development. However, the development can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the developments herein described.

The system and method described herein can be implemented on various configurations of hardware and software. The system can be comprised of various modules, tools, and applications as discussed below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of a preferred system. Thus, the processes that are undergone by each of the modules may be arbitrarily redistributed to one of the other modules, combined together in a single module, or made available in, for example, a shareable dynamic link library. Depending on the embodiment, certain modules may be removed, merged together, or rearranged in order. Also depending on the embodiment, certain steps of the methods may be added, rearranged, combined, or removed.

The system modules, tools, and applications may be written in any programming language such as, for example, C, C++, C #, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, C #, BASIC, Visual Basic, Pascal, Ada, Java, HTML, XML and FORTRAN are industry standard programming languages for which many commercial compilers can be used to create executable code.

Definitions

The following provides a number of useful possible definitions of terms used in describing certain embodiments of the disclosed development.

A network may refer to a network or combination of networks spanning any geographical area, such as a local area network (LAN), wide area network (WAN), regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others. In addition, connectivity to the network may be, for example, via remote modem, Ethernet (IEEE 802.3), Token Ring (IEEE 802.5), Fiber Distributed Datalink Interface (FDDI) or Asynchronous Transfer Mode (ATM). As used herein, the network includes network variations such as the public Internet, a private network within the Internet, a secure network within the Internet, a private network, a public network, a value-added network, an intranet, and the like.

A website may refer to one or more interrelated web page files and other files and programs on one or more web servers. The files and programs are accessible over a computer network, such as the Internet, by sending a hypertext transfer protocol (HTTP or HTTPS [S-HTTP]) request specifying a uniform resource locator (URL) that identifies the location of one of the web page files, where the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may include that which is presented by a standard web browser in response to an HTTP request specifying the URL by which the web page file is identified. A web page can include, for example, text, images, sound, video, and animation.

A computer or computing device may be any processor controlled hardware device. The computer or computing device may be a device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants (PDAs), interactive or web-enabled wireless communications devices, mobile web browsers such as operating on a smartphone, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor, multi-processor or multi-core machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, UNIX, any of the versions of Microsoft Windows, Apple MacOS, IBM OS/2 or other operating system. The appropriate operating system may include a communications protocol implementation that handles all incoming and outgoing message traffic passed over the network. In other embodiments, while the operating system may differ depending on the type of computer, the operating system will continue to provide the appropriate communications protocols to establish communication links with the network.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to a website. In one instance, the website includes program logic, which enables the website to communicate with the externally implemented components, modules, and databases to perform the functions such as disclosed herein.

Overview

For the purposes of this discussion, the U.S. Postal Service (USPS) will be referred to as the service business, although numerous entities can fulfill this role.

In certain embodiments, an application or internet provider or intranet provider can add value to the user experience by providing an application, web based plugin, or helper application. This application, web based plugin, or helper application may be native to the internet or intranet application or available for download. The application, web based plugin, or helper application can appear to a user as an icon and/or link located with or without instruction on icon and/or link use. The icon or link can appear anywhere on any electronic application, internet and intranet screen rendering. The application, web based plugin, or helper application is for the purpose of enabling/supporting user initiated request(s) for material or information, including, for example, catalogs, brochures, samples and so forth. The user can add, edit or delete contact information, or ratings preferences or terms of use agreement which can be shared by the user with any internet or intranet provider of the user's choice to request additional materials or information. The materials or information can be fulfilled via mail (post), shipper, courier, email, phone, fax, short message service (SMS), multimedia messaging service (MMS), or Internet or Intranet or social networking messaging services.

In certain embodiments, an application, web based plugin, or helper application is available for the user to download if not natively installed in the application, internet or intranet browser. The user can download and install the application, web based plugin, or helper application if not natively installed. The user populates their contact information, and/or rating preferences and/or Terms of Use Agreement Acceptance. The user's contact data and/or rating preferences, and/or Terms of Use Agreement can either be stored locally in a data table or list or stored in an internet or intranet database.

Referring to FIG. 1, in one embodiment 100, a user can enter search terms 120 into a search engine search box 110. The search engine renders results 130 locating an icon and/or link (shown with underlining) with or without instructions on the icon and/or link use adjacent (before, after, above or below) to any search results. The user can click 140 the icon and/or link adjacent to the search engine results.

Figure 4:
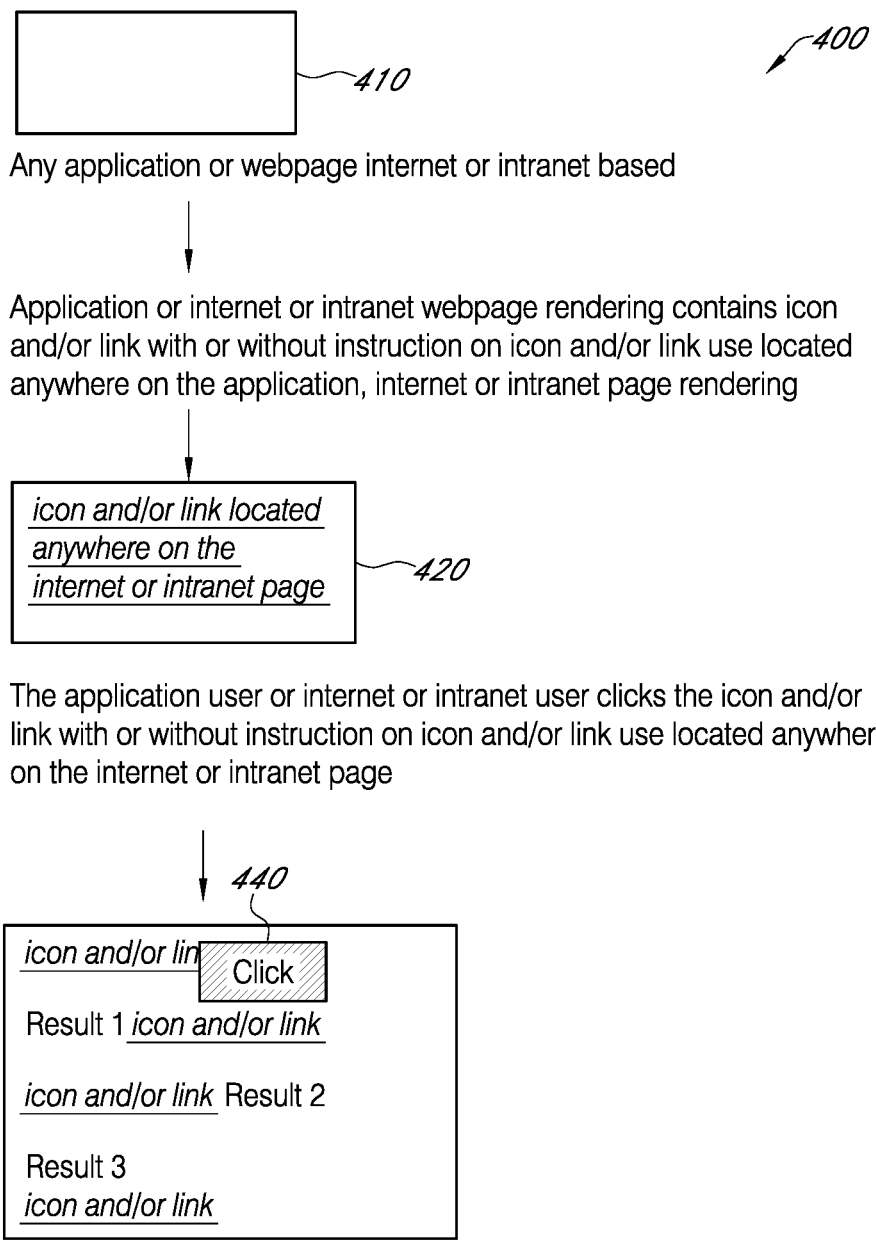
FIG. 4 is a flow diagram with example screen displays as displayed on a client machine in an example application or webpage embodiment of the system and method.

Referring to FIG. 4, in another embodiment 400, a user utilizes an installed application, web based plugin, or helper application 410. The application or internet or intranet webpage rendering contains icon(s) and/or link(s) with or without instructions on the icon and/or link use located anywhere on the application, internet or intranet page rendering 420. The application user or internet or intranet user can click 440 the icon and/or link located anywhere on the page.

In either embodiment 100 or 400, when the icon and/or link is clicked by the user, a set of steps is initiated as follows:

Referring to FIG. 2, an application form or table or list can be presented with or without instructions. The application user or internet or intranet user can be presented with contact data fields 200 and may also be presented with Ratings Preferences and/or and may also be presented with Terms of Use/Opt In Agreement. The internet and intranet provider to enable the collection of contact data elements such as: Name(s), Home or Alternate Mailing Address(es), Email Address(es), Phone Number(s), Social Network Identification, or Social Network Names or Social Network Names Aliases via application or form.

a. The data collection process may vary as to contact data elements collected.
   b. The data collection process may or may not contain ratings preferences.
   c. The data collection process may or may not contain opt in Terms of Use/Opt In Agreement for the contact data provided.

Referring to FIG. 3, the application user or internet or intranet user can input contact field data 300 and Ratings Preferences if presented with that option and/or review/accept/deny Terms of Use/Opt In Agreement if present. The application user or internet or intranet user can press a button 310 or take some action to save the contact data. This contact data and/or Ratings Preferences and if required associated Terms of Use/Opt In Agreement can be stored in physical form (e.g., paper) by the search provider and/or electronically with any of the following database structures.

A database model is a type of data model that determines the logical structure of a database and fundamentally determines in which manner data can be stored, organized, and manipulated. The most popular example of a database model is the relational model, which uses a table-based format.

Common logical data models for databases include:
Hierarchical database model
Network model
Relational model
Entity-relationship model
Enhanced entity-relationship model
Object model
Document model
Entity-attribute-value model
Star schema
An object-relational database combines the two related structures.
Physical Data Models Include:
Inverted index
Flat file
Other Models Include:
Associative model
Multidimensional model
Multivalue model
Semantic model
XML database
Named graph
Triplestore The application, internet and/or intranet webpage provider may use the search terms or phrases, contact data and Terms of Use/Opt In Agreement in any of the following ways:

Developing, creating or updating user accounts, contact list(s) on internal or external database servers.

And/or, the application, internet and/or intranet search provider may sell, rent, lease, share, market, offer or tender this contact data with or without associated Terms of Use/Opt In Agreement and with or without search terms or phrases, individually or in batch to one or more internet or intranet entities and/or business entities with a physical storefront for free or for fee. This enables a secondary opportunity for the internet or intranet provider to market and/or sell qualified leads through electronic and/or internet and/or paper based communication process. It may be determined that the user has qualified interest in a product and/or service and/or information by his entering one or more search terms or phrases. The internet or intranet entities may receive a secondary solicitation benefit from the application, internet and/or intranet provider beyond having a link with or without video, graphics, images, or text displayed to the application, internet or intranet user at the time of search. The application, internet and/or intranet search result entities will find value in these qualified user leads. The delivery of the requested Information for Products, Services, or information may be via mail (post), shipper, courier, email or other electronic communication mode or channel.

The entity receiving the lead may use this contact information in any of the following ways: developing, creating or updating user accounts, contact list(s) or by providing information or marketing materials on products, product samples, services or information for free or for fee to the searcher who has made the request. The delivery of the requested Information for Products, Services or information may be via mail (post), shippers, couriers, email or other electronic communication mode or channel.

The application, Internet and/or intranet search provider may use this contact data and/or Ratings Preferences and/or Terms of Use/Opt In Agreement in any of the following ways: developing, creating or updating user accounts, contact list(s).

And/or, the application, Internet and/or intranet search provider may sell, rent, lease, share, market, offer or tender this contact data and/or Ratings Preferences and/or Terms of Use/Opt In Agreement individually or in batch to Internet or intranet entities and/or business entities with a physical storefront for free or for fee.

Example Computing Environments

Figure 5:
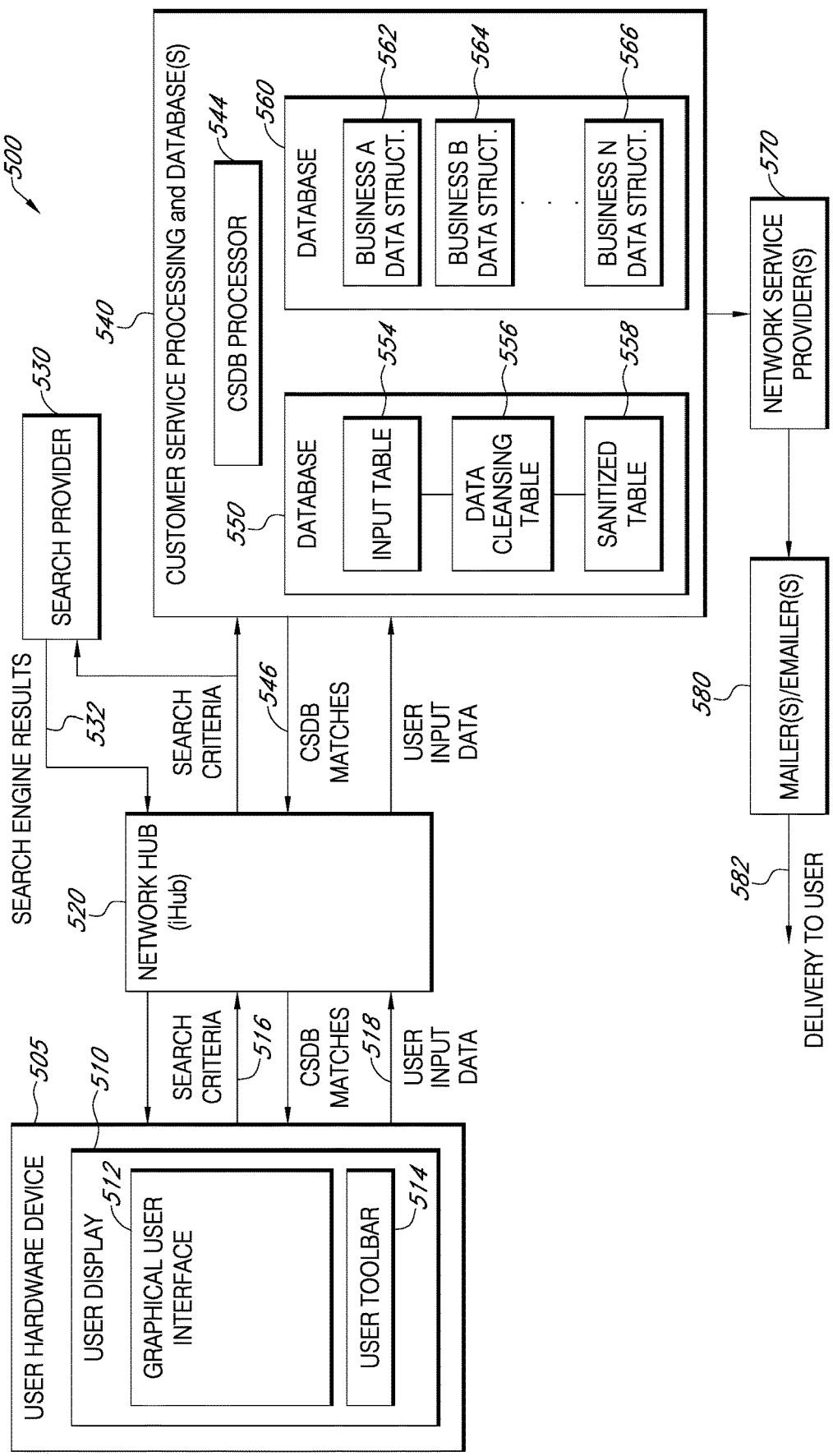
FIG. 5 is a diagram of an example configuration of entities and components of one embodiment of the system and method.

The system and method may utilize an example architecture that may be based on, for example, a user interface interacting with a local or remote data repository and a local or remote application running on a local or remote application server, such as an application server 540 of FIG. 5.

Referring to FIG. 5, a block diagram of an example system 500 that may be used to implement certain systems and methods is described herein. The functionality provided for in the components and modules of computing system 500 may be combined into fewer hardware components and modules or further separated into additional components and modules. Various other types of electronic devices communicating in a networked environment may also be used. An example configuration of system 500 can be used by a native application or by a toolbar plug-in such as will be described hereinbelow, including a process for the native application and a separate process for the toolbar plug-in.

A display 510 on a mobile or fixed user computing device 505 such as a mobile telephone or computer device operated by a user displays a graphical user interface 512 and/or a user toolbar 514. There can be other mobile or fixed computing devices operated by other users. The computing device 505 can be a handheld computing device or other portable computing device such as a tablet or laptop personal computer (PC), Linux based handheld, PDA, smartphone such as an iPhone® or Android™ based phone, a tablet computer such as an iPad® or Android based tablet, or a PC having a display. In other embodiments, the computing device can be any form of a network or Internet connected device, including but not limited to PCs, mobile devices, PDA, laptops, tablets, chips, keyboards, voice audio and video software, mouse, keypads, touch pads, track ball, microphones, videos, storage devices, network devices, databases, scanners, copiers, digital pens, image recognition software and device, screens and other forms of displays, netbooks and other forms of computer hardware. In certain embodiments, the computing device 505 is in communication with one or more servers 540 via a network hub 520 (also referred to as an iHub), via a local area network, a wide area network, an intranet or the Internet (not shown). In certain embodiments, the iHub can be a gateway or server operated by the service business, such as the USPS, or it can be an Internet service provider server, any of which includes one or more hardware processors operating on software instructions in a circuit, on a computer readable medium or other way of storing and accessing the instructions.

The server(s) 540 can include one or more processors, memory, data storage, system software and one or more databases operated on by the processor(s) and input or output devices. In certain embodiments, the processor(s) can include a customer service database (CSDB) processor 544, and the database(s) can include a first database 550 and a second database 560. In certain embodiments, the data storage may stores the one or more databases used by the system. The processor(s) are in communication with the database(s) via a database interface, such as structured query language (SQL) or open database connectivity (ODBC). In certain embodiments, the data storage is not included in server(s) 540, but is in data communication with the server (s) via the database interface. The connection from the computing device 505 to the network hub 520 can be a wireless or a satellite connection or a wired or direct connection. In certain embodiments, the server(s) are part of a web site, such as a site on an intranet or the Internet.

When the computing device 505 is connected with the server(s) 540, the web site may optionally provide updates on new features. In another embodiment, the computing device runs software for the system and method described herein only when connected to the server(s) 540.

The computing device 505 can include a processor, a memory, a display 510, and one or more input devices. The processor can be in data communication with a data storage. In certain embodiments, the data storage may store prior records of the user and/or other data and/or software. System software can be executed by the processor. The system software may include the application graphical user interface (GUI) 512. The application GUI can include a database interface to the data storage of the computing device. In certain embodiments, the software is loaded from the data storage. In embodiments where the computing device 505 communicates with a web site, the processor utilizes browser software in place of or in addition to the software. The network browser may be, for example, Microsoft Internet Explorer®, Apple Safari®, Mozilla Firefox®, Google Chrome™, browsers from Opera Software™, and so forth. An output device, such as a printer is connected to the computing device 505.

The network hub 520 is in further data communication with a user experience connector or search provider 530 utilizing one or more search engines. The user experience connector/search provider can be utilized through user interfaces such as computers, electronic devices or through any natural language interface and infrastructure such as Application Programming Interfaces (APIs). In certain embodiments, the user computing device 505 through the graphical user interface 512 provides search criteria 516 and other user input data 518 to the network hub 520. The search criteria 516 are passed on to the search provider 530 for performing a search of the web or other data sources. Search engine results 532 are provided back to the network hub 520 for transmission to the computing device 505 and/or directly to the display 510 of the computing device 505 using the GUI 512.

The first database 550 includes an input table 554, a data cleansing table 556 and a sanitized table 558. In certain embodiments, the input table 554 includes records for users using the system 500, where data entered, such as done at the example display of FIG. 3, for data fields identified in FIG. 2 is stored. The sanitized file 558 is to cleanse personally identifiable information or personally identifying information (PII) from the input table 554 so that the PII does not get distributed. Therefore, the record fields in the sanitized table are not the same as in the input table. In information security and privacy, PII can be any piece of information which can be used to uniquely identify an individual or with respect to which there is a reasonable basis to believe that the information can be used to identify the individual, or information that can be used to distinguish or trace the individual's identity. Generally included in this category are an individual's name or another personal identifier, social security number or similar number, biometric records, date and place of birth, and mother's maiden name.

The CSDB processor 544 can provide CSDB matches 546 to the iHub 520 and further to the user computing device 505. These matches are used to provide recommendations to the user about what might be a good fit.

The second database 560 includes several data structures that are associated with businesses wanting to provide product information to users. For example business A provides a data structure 562, business B provides a data structure 564 and so forth up to business N providing data structure 566. In certain embodiments, each of the data structures from a particular business maps selected keyword combinations to corresponding icons and/or links and further to particular material/information corresponding to each keyword combination. Related to the particular material/information corresponding to the keyword combinations is a way to initiate the sending of the particular material/information corresponding to a user initiated request via one of several methods. One of the ways for sending the material/information is via the United States Postal Service mail or via a courier, or by email or other electronic communication mode or channel, or still further methods. For example, if the user is interested in a particular model of an automobile, an icon and/or link is stored in the data structure along with keywords regarding the automobile model and one or more ways that the material, e.g., brochure for the automobile model, can be provided to the user.

In certain embodiments, each business can provide one or more updates for its corresponding data structure when new keywords, new icons and/or links, new material/information and/or new ways to provide the material/information to the user to be utilized. If updates are provided, the relevant records in the data structure for the particular business are updated. In other embodiments, there are other data fields in the data structures for each business, such as, for example, a material/information identifier, a particular and/or location of service provider and/or mailer for the particular material/information, and how fees, e.g., postage, (if applicable) are to be handled.

In certain embodiments, the CSDB processor 544 transforms the data from a record in the input table 554 corresponding to a particular user to a record in the sanitized table 558 for the particular user. The data from the input record in the table 554 is sent to the data cleansing table 556, which then goes through a data validation such as conforming the input data to actual valid mailing addresses. A data cleansing algorithm can include example processes such as conforming the input data to actual valid mailing addresses and/or electronic addresses and/or checking and revising other data. Then the data cleansing table 556 sends the data to the sanitization table 558, which tokenizes certain information before passing it on to service provider 570, which is one of multiple possible service providers such as a network service provider or an Internet service provider, and/or to a mailer/emailer 580, which is one of multiple possible mailers/emailers. In some embodiments, tokenization is the process of replacing sensitive data with unique identification symbols, such as alphanumeric characters, that retain essential information about the data without compromising its security.

The processing on the output of the data cleansing table 556 can be accomplished by a sanitizing algorithm such as, for example, replacing certain information with a designated identification number, such as a "token" so that data captured at one location does not need to be distributed for security reasons. In some embodiments, a USPS Address Validation application programming interface, which can only be used in conjunction with USPS mailing or shipping services, may be utilized in addition to the sanitizing services and/or data cleansing services.

The service provider 570 and/or the mailer 580 can include one or more specialized machines to automate delivery of the material/information. In certain embodiments, the CSDB processor 544 provides a ready-to-send signal to control another machine to initiate a delivery, and also provides at least portions of a record from the sanitized table 558 for a particular user, an identifier and/or location of the material/information to be sent to the user or a third party to the service provider 570 and/or mailer 580. The service provider 570 and/or mailer 580 utilize the signal and data provided from the CSDB processor to initiate a delivery 582 to the user. In certain embodiments, for example, the service provider and/or mailer can, upon receipt of the signal, the identifier and/or location, initiate automatically packaging the desired material, e.g., a sample, applying postage and initiating a mailing to the user using portions of the sanitized record for the particular user. In certain embodiments, these automatic operations on the specialized machines can be performed up to about one hundred times faster and with fewer errors than a human operator performing the same tasks. In certain embodiments, one or more hardware controllers can determine the rate of operation of the specialized machines.

Depending on the nature of the information desired, the particular business associated with the icon/link selected by the user may request the material or information to be mailed, such as via the USPS, or emailed or sent via other electronic communication method 580. In other embodiments of system 500, one or more of the databases 550 and 560 is configured to be independent of the CSDB processor, and can be accessed through a database manager, for example.

Figure 6:
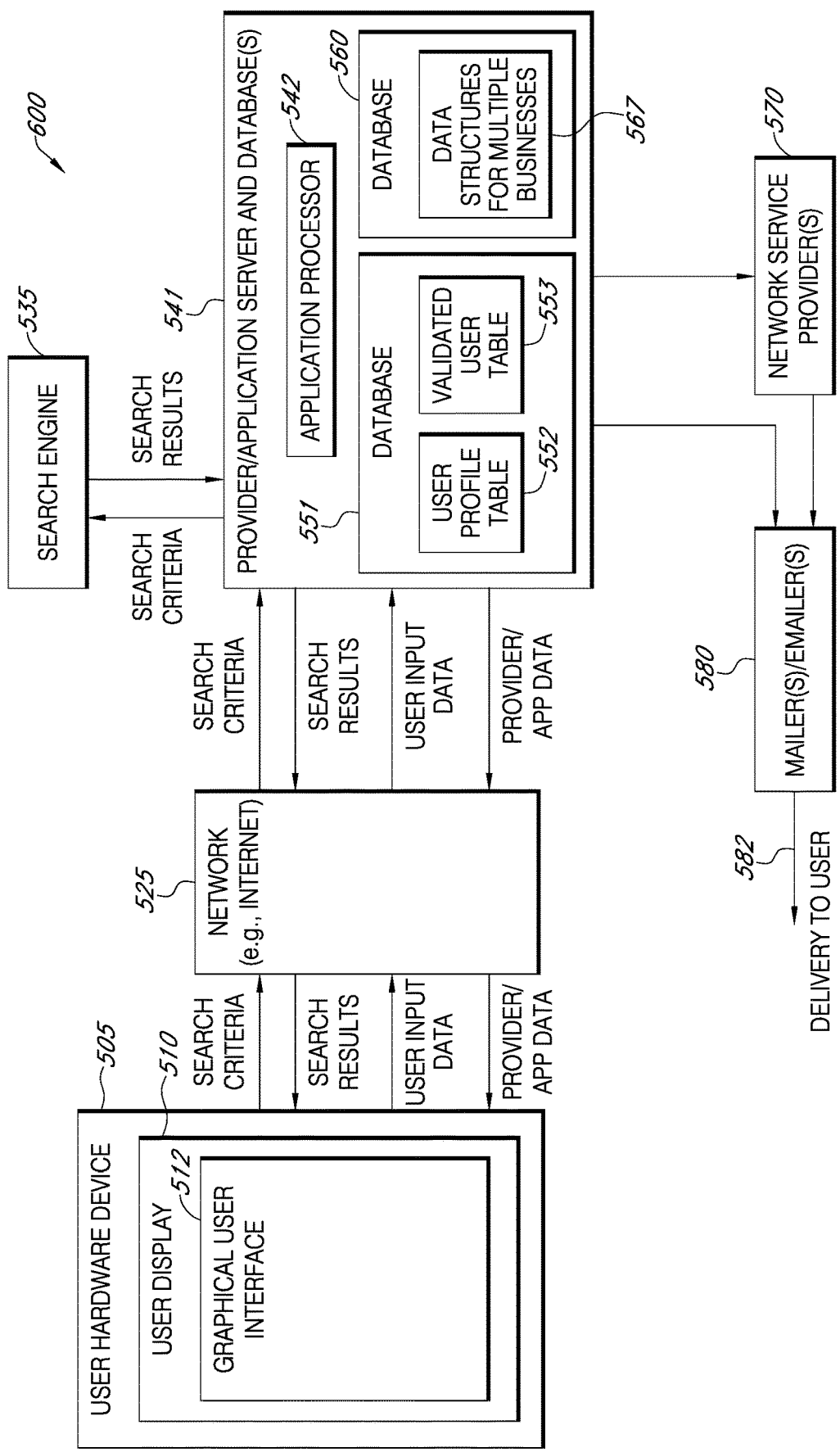
FIG. 6 is a diagram of an example configuration of entities and components of another embodiment of the system and method.

Referring to FIG. 6, a block diagram of an example system 600 that may be used to implement certain systems and methods is described herein. The functionality provided for in the components and modules of computing system 600 may be combined into fewer hardware components and modules or further separated into additional components and modules. Various other types of electronic devices communicating in a networked environment may also be used. An example configuration of system 600 can be used by a web application where the user can be logged-in or in the alternative, not logged-in such as will be described hereinbelow, including a process for the logged-in web application and two separate processes for the not logged-in web application.

System 600 is similar in some regards to the system 500 previously described so that common elements having the same reference label will not be described again. In system 600, the network hub 520 utilized in system 500 is not used in system 600. Furthermore, the customer service processing server and database(s) 540 utilized in system 500 is replaced with a provider/application server and database(s) 541. Data is sent between the user computing device 505 and the provider/application server 541 through a network 525, such as a local area network, a wide area network, an intranet or the Internet. The provider/application server 541 is in communication with a search engine 535 by providing search criteria received from the user computing device 505 through the network 525 to the search engine 535 and receiving search results back from the search engine. These search results can be sent back to the user computing device 505 through the network 525. In certain embodiments, the user computing device 505 can provide user input data obtained through the graphical user interface 512 to the provider/application server 541 through the network 525. The provider/application server 541 can then provide provider/application data back through the network to the graphical user interface 512 of the computing device 505.

In certain embodiments, the provider/application server 541 can include an application or provider processor 542, a first database 551 and a second database 560. The first database 551 can include a user profile table 552 and a validated user table 553. The second database 560 can include data structures for multiple businesses 567, which can comprise separate data structures for a plurality of businesses such as shown in FIG. 5. For example, business A may have a first data structure, business B may have a second data structure and so forth through business N.

In certain embodiments, the application or provider processor 542 provides a ready-to-send signal, at least portions of a record from the validated user table 553 for a particular user, an identifier and/or location of the information/material to be sent to the user or a third party to the service provider 570 and/or mailer 580. The service provider and/or mailer 580 utilize the data provided from the application or provider processor 542 to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the validated record for the particular user.

In other embodiments of system 600, one or more of the databases 551 and 560 is configured to be independent of the application or provider processor, and can be accessed through a database manager, for example.

Figure 7:
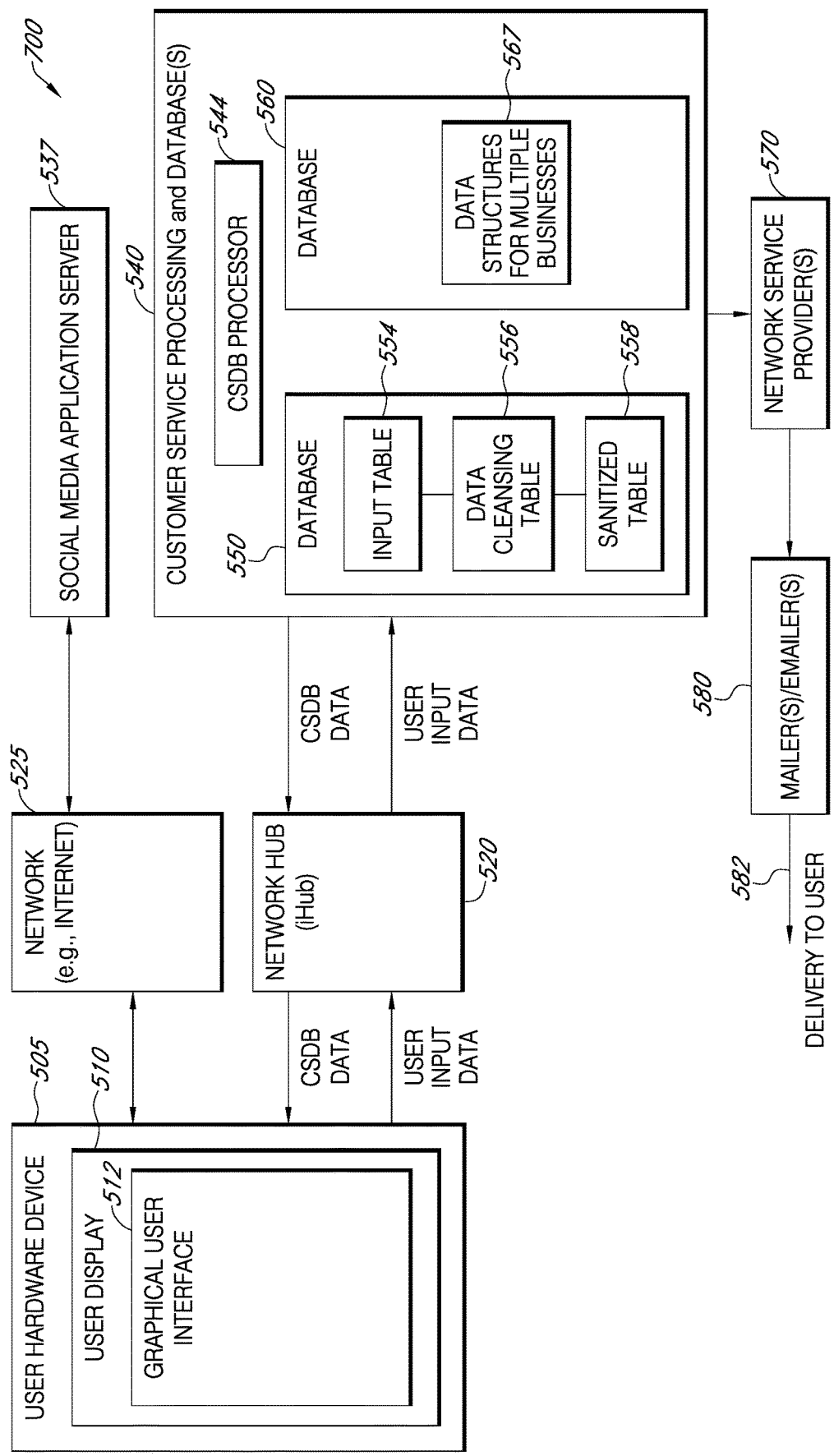
FIG. 7 is a diagram of an example configuration of entities and components of another embodiment of the system and method.

Referring to FIG. 7, a block diagram of an example system 700 that may be used to implement certain systems and methods is described herein. The functionality provided for in the components and modules of computing system 700 may be combined into fewer hardware components and modules or further separated into additional components and modules. Various other types of electronic devices communicating in a networked environment may also be used. An example configuration of system 700 can be used by a social media application where a server, such as operated by the USPS, utilizing a CSDB processor is used, such as will be described hereinbelow, including a process for a social media application.

System 700 is similar in some regards to the systems 500 and 600 previously described so that common elements having the same reference label will not be described again. System 700 includes a social media application (SMA) server 537 operating one or more social media applications. SMA server 537 interacts with user device 505 through the network 525. The network hub 520 passes through user input data to the customer service processing server 540, and passes through CSDB data received from the server 540. In other embodiments of system 700, one or more of the databases 550 and 560 is configured to be independent of the CSDB processor, and can be accessed through a database manager, for example.

Figure 8:
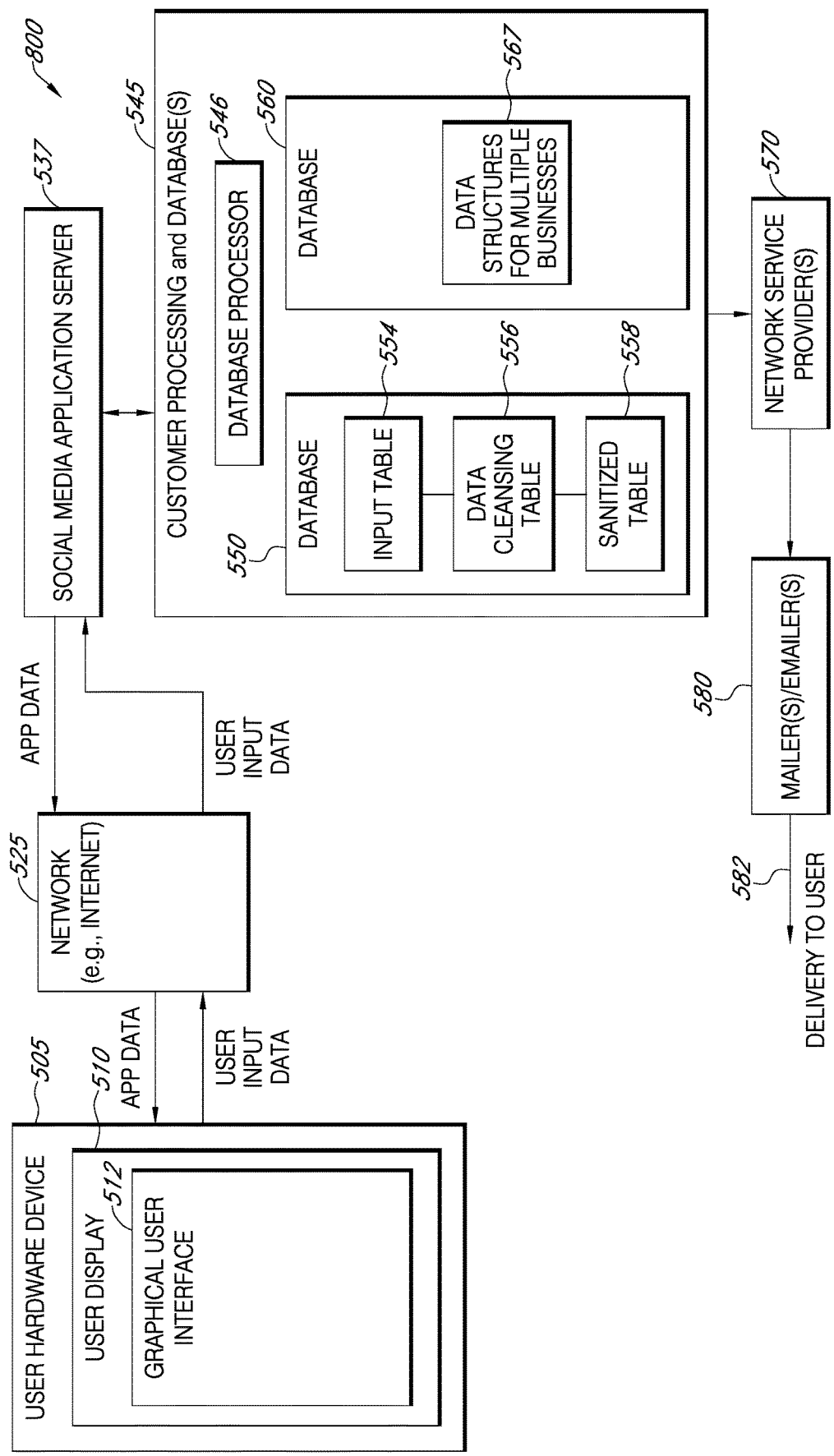
FIG. 8 is a diagram of an example configuration of entities and components of another embodiment of the system and method.

Referring to FIG. 8, a block diagram of an example system 800 that may be used to implement certain systems and methods is described herein. The functionality provided for in the components and modules of computing system 800 may be combined into fewer hardware components and modules or further separated into additional components and modules. Various other types of electronic devices communicating in a networked environment may also be used. An example configuration of system 800 can be used by a social media application where a server, such as operated by a third party including an Internet service provider, utilizing a database processor is used, such as will be described hereinbelow, including a process for another embodiment of a social media application.

System 800 is similar in some regards to the systems 500, 600 and 700 previously described so that common elements having the same reference label will not be described again. In certain embodiments of system 800, the network hub 520 is not utilized, and therefore, the SMA server 537 interacts with user device 505 via an application through the network 525. The network 525 passes through user input data to the SMA server 537, and passes through application data received from the server 537. Furthermore, the SMA server 537 interacts with a customer processing and database(s) server 545. The customer processing server 545 is similar to the server 540; however, the customer processing server 545 includes a database processor 546 that interfaces with the database 550 and the database 560.

In certain embodiments, the database processor 546 provides a ready-to-send signal, at least portions of a record from the sanitized table 558 for a particular user, an identifier and/or location of the information/material to be sent to the user or a third party to the service provider 570 and/or mailer 580. The service provider and/or mailer 580 utilize the data provided from the database processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the sanitized record for the particular user.

In other embodiments of system 800, one or more of the databases 550 and 560 is configured to be independent of the database processor, and can be accessed through a database manager, for example.

Figure 9:
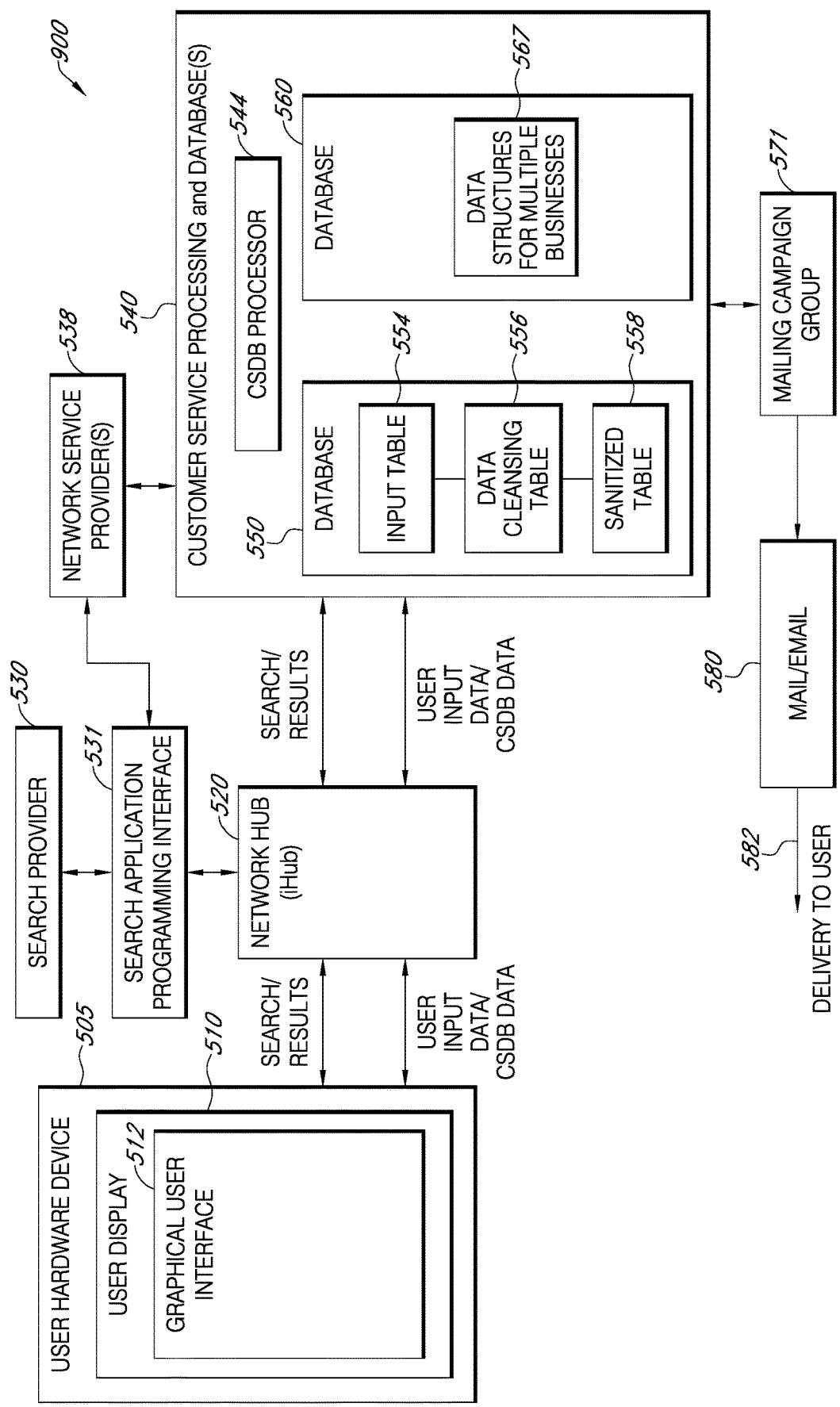
FIG. 9 is a diagram of an example configuration of entities and components of another embodiment of the system and method.

Referring to FIG. 9, a block diagram of an example system 900 that may be used to implement certain systems and methods is described herein. The functionality provided for in the components and modules of computing system 900 may be combined into fewer hardware components and modules or further separated into additional components and modules. Various other types of electronic devices communicating in a networked environment may also be used. An example configuration of system 900 can be used by a search application programming interface where a server, such as operated by the USPS, utilizing a CSDB processor is used, such as will be described hereinbelow, including a process for a search application programming interface.

System 900 is similar in some regards to the systems 500, 600, 700 and 800 previously described so that common elements having the same reference label will not be described again. System 900 includes a search application programming interface 531 interfacing with one or more search provider(s) 530, one or more network service provider(s) 538, such as an Internet service provider, and the network hub 520. The customer service processing and database(s) server 540 interacts with user device 505 through the network hub 520. The network hub 520 passes through user input data and CSDB data between the customer service processing server 540 and the user device 505, and passes through search criteria and results received from the server 540.

In certain embodiments, the CSDB processor 544 provides a ready-to-send signal, at least portions of a record from the sanitized table 558 for a particular user, an identifier and/or location of the information/material to be sent to the user or a third party to a mailing campaign group 571 and/or mailer 580. The mailing campaign group 571 and/or mailer 580 utilize the data provided from the CSDB processor to initiate a delivery 582 to the user. In certain embodiments, for example, the mailing campaign group 571 and/or mailer can initiate, upon receipt of the signal, the identifier and/or location, automatically packaging the desired material, e.g., a sample, applying postage and initiating a mailing to the user using portions of the sanitized record for the particular user.

In other embodiments of system 900, one or more of the databases 550 and 560 is configured to be independent of the CSDB processor, and can be accessed through a database manager, for example.

Figure 10:
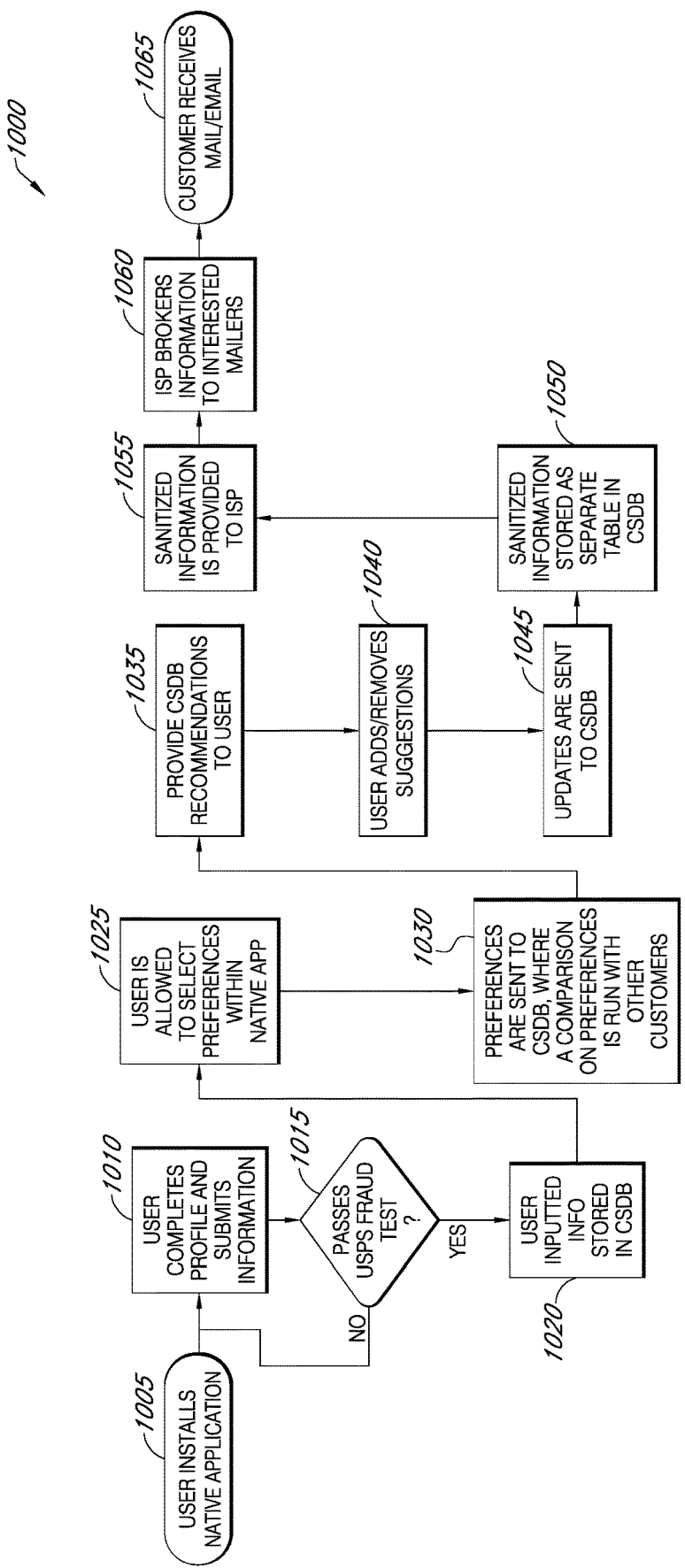
FIG. 10 is a flowchart of an example native application embodiment using the example system shown in FIG. 5.

Referring to FIG. 10, an example native application process 1000, using an example system such as system 500 shown in FIG. 5, will now be described. If the user has not previously installed a native software application, the software application is installed at a step 1005. Proceeding to a step 1010, the user completes a user profile and submits the information to the application. Proceeding to a decision step 1015, process 1000 determines if the information presented in the user profile passes a fraud test, such as a USPS fraud test. The test can includes measures such as checking for: 1) repeated signup attempts of the exact same mailing with the same information, 2) including information the USPS knows not to be true by validating through data repositories such as USPS.com and MyUSPS.com, and 3) sending to invalid addresses, which can be verified through a check to the Address Management System (AMS) of the USPS. In certain embodiments this determination is performed by the CSDB processor 544 of system 500. If the profile information does not pass the test, process 1000 returns to step 1010 to request corrected information from the user. In other embodiments, process 1000 can end the process 1000 due to the fraud. However, if the information provided in the user profile does pass the fraud test, process 1000 advances to a step 1020 where the user inputted information is stored in the customer service database. In lieu of a profile identification as identified above, a user has the ability to sign on via phone information credentials. In this process, the web browser or application would utilize the phone as a security token to query the information the system operator, such as the USPS, already has on file. So long as the phone is listed on the user account, it can be used with previously provided information to authenticate and pre-populate the registration data. In certain embodiments, this information may be stored in the input table 554 of database 550 such as shown in FIG. 5.

Continuing at a step 1025, process 1000 allows the user to select preferences within the native application, such as a letter vs magazine preference, or fly-fishing vs computer programming, for example. Continuing at a step 1030, process 1000 sends the preferences to the customer service processor 544 and database 550 where a comparison on the preferences can be run against the data from other users. Advancing to a step 1035, process 1000 provides recommendations from the customer service processor 544 to the user. Proceeding to a step 1040, the user can add or remove suggestions received from the customer service processor 544. The added or removed suggestions, which can be considered as updates, are sent to the customer service processor for storage in the database 550. At this time, data in the record for the particular user in input table 554 is sent to a data cleaning table 556 of the database 550, in certain embodiments. The data in the record for the particular user is then processed to generate a record in the sanitized table 558 of the database 550 in FIG. 5. The records in the data cleansing tables, such as table 556, are updated using methods including, but not limited to, customer registration data, myUSPS data, and external vendor data. MyUSPS, for example, includes data obtained via a verification process when signing up for a service that allows the user to track status information and manage packages at any time from a computer or web-enabled device.

After the sanitized information is stored in the sanitized table in the database 550 at step 1050, in certain embodiments, the CSDB processor 544 provides a ready-to-send signal, at least portions of a record from the sanitized table 558 for a particular user, an identifier and/or location of the information/material to be sent to the user or a third party to the service provider 570 and/or mailer 580 at a step 1055. The service provider and/or mailer 580 utilize the data provided from the CSDB processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the sanitized record for the particular user.

Subsequently, the desired information or material is received by the user via mail or email or other way at a step 1065. In certain embodiments, the service provider acts as an intermediary to establish agreements for relationships with one or more mailers, which are then utilized in the implementation and processing of the mailings to various users of the system and method. In other embodiments, the service provider acts as an intermediary to arrange agreements with interested mailers for the sanitized user information at step 1060.

Figure 11:
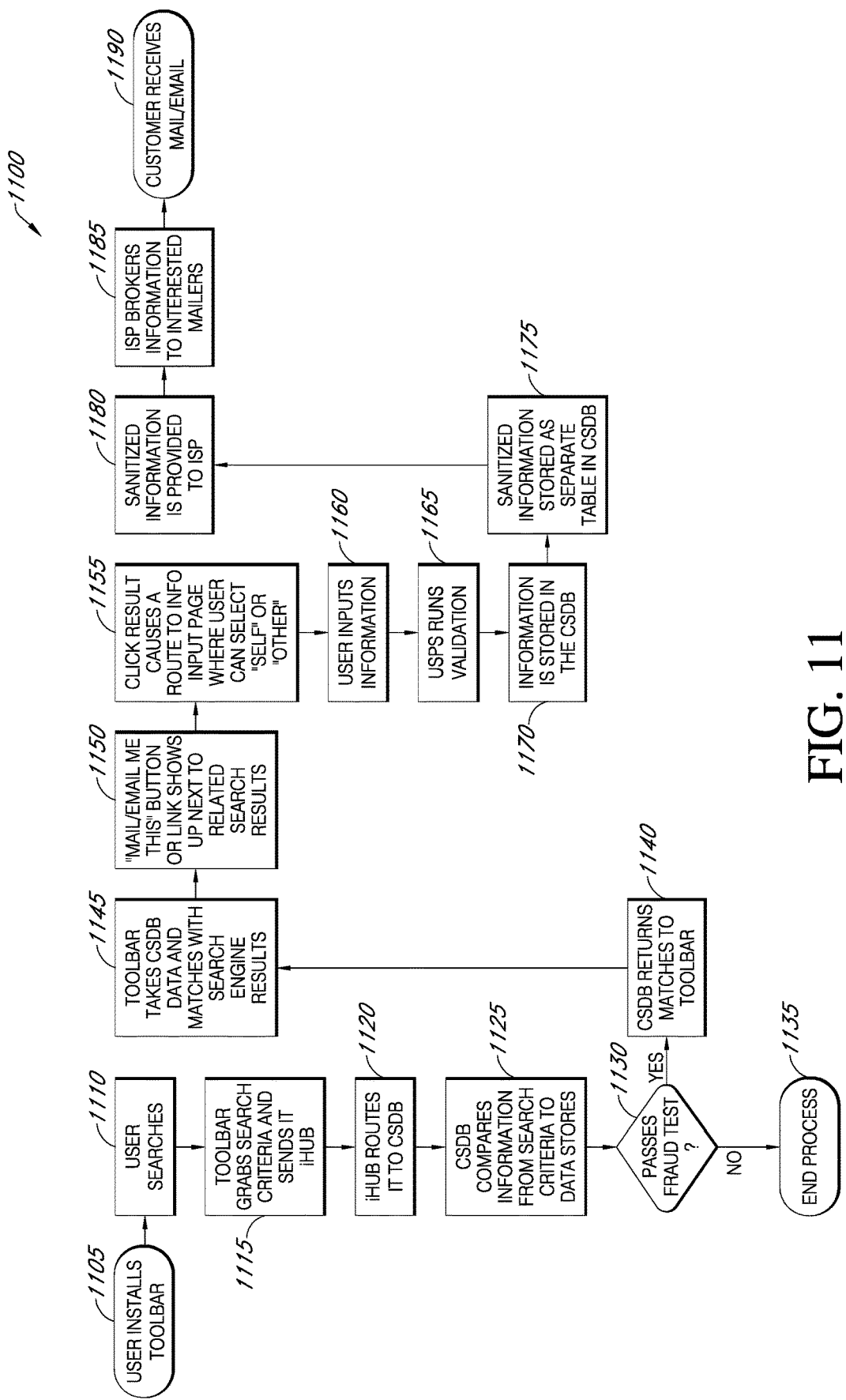
FIG. 11 is a flowchart of an example toolbar plugin embodiment using the example system shown in FIG. 5.

Referring to FIG. 11, an example toolbar plug-in process 1100, using an example system such as system 500 shown in FIG. 5, will now be described. At a step 1105, the user installs a toolbar 514. Proceeding to a step 1110, user performs a search using any of well-known ways to search the web, for example using search engines like Google, Yahoo, and AskJeeves.com. Moving to a step 1115, the toolbar 514 grabs the search criteria and sends it to the iHub or network hub 520. Advancing to a step 1120, the iHub routes the search criteria to the customer service processor 544. At a step 1125, the customer service processor compares information from the search criteria to data in the database 560. Continuing at a decision step 1130, process 1100 determines if the data passes a fraud test. This fraud test is mainly being used to determine if the request is authentic. The test can include measures such as checking for repeated signup attempts of the exact same mailing with the same information, including information the system operator, such as the USPS, knows not to be true by validating through data repositories such as USPS.com and MyUSPS.com, and sending to invalid addresses, which can be verified through a check to the Address Management System (AMS). If the fraud test fails at the decision step 1130, process 1100 proceeds to the end process state 1135. However if the fraud test is passed, the customer service processor 544 returns the matches to the user toolbar 514 at a step 1140. At a step 1145, the toolbar takes the customer service database data, e.g., an icon and/or link, and matches it with the relevant search engine results.

At a step 1150, process 1100 facilitates a "mail/email me this" button or link to show up next to the related search results on the graphical user interface 512. A click result on the button/link at step 1155 causes a route to an information input page where the user can select either "self" or "other". Moving to a step 1160, the user inputs information requested about either themselves or about another party. At a step 1165, the USPS or other service can run a validation of the input data. This process works similarly to the fraud test at step 1130, where the system operator, e.g., USPS, systems run checks against the inputted data. The validated information is stored at step 1170 in the database 550, and specifically in the input table 554. Also at step 1170, the user service processor can perform data cleansing on a record in the input table 554 corresponding to the present user and a sanitization process on a record of the data cleansing table 556 corresponding to the present user so as to generate a new or updated record for the user that is stored in the sanitized table 558 at step 1175.

In certain embodiments, the CSDB processor 544 provides a ready-to-send signal, at least portions of a record from the sanitized table 558 for a particular user, an identifier and/or location of the information/material to be sent to the user or a third party to the service provider 570 and/or mailer 580 at a step 1180. The service provider and/or mailer 580 utilize the data provided from the CSDB processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the sanitized record for the particular user.

Subsequently, the desired information or material is received by the user via mail or email or other way at a step 1190. In certain embodiments, the service provider acts as an intermediary to establish agreements for relationships with one or more mailers, which are then utilized in the implementation and processing of the mailings to various users of the system and method. In other embodiments, the service provider acts as an intermediary to arrange agreements with interested mailers for the sanitized user information at step 1185.

Figure 12:
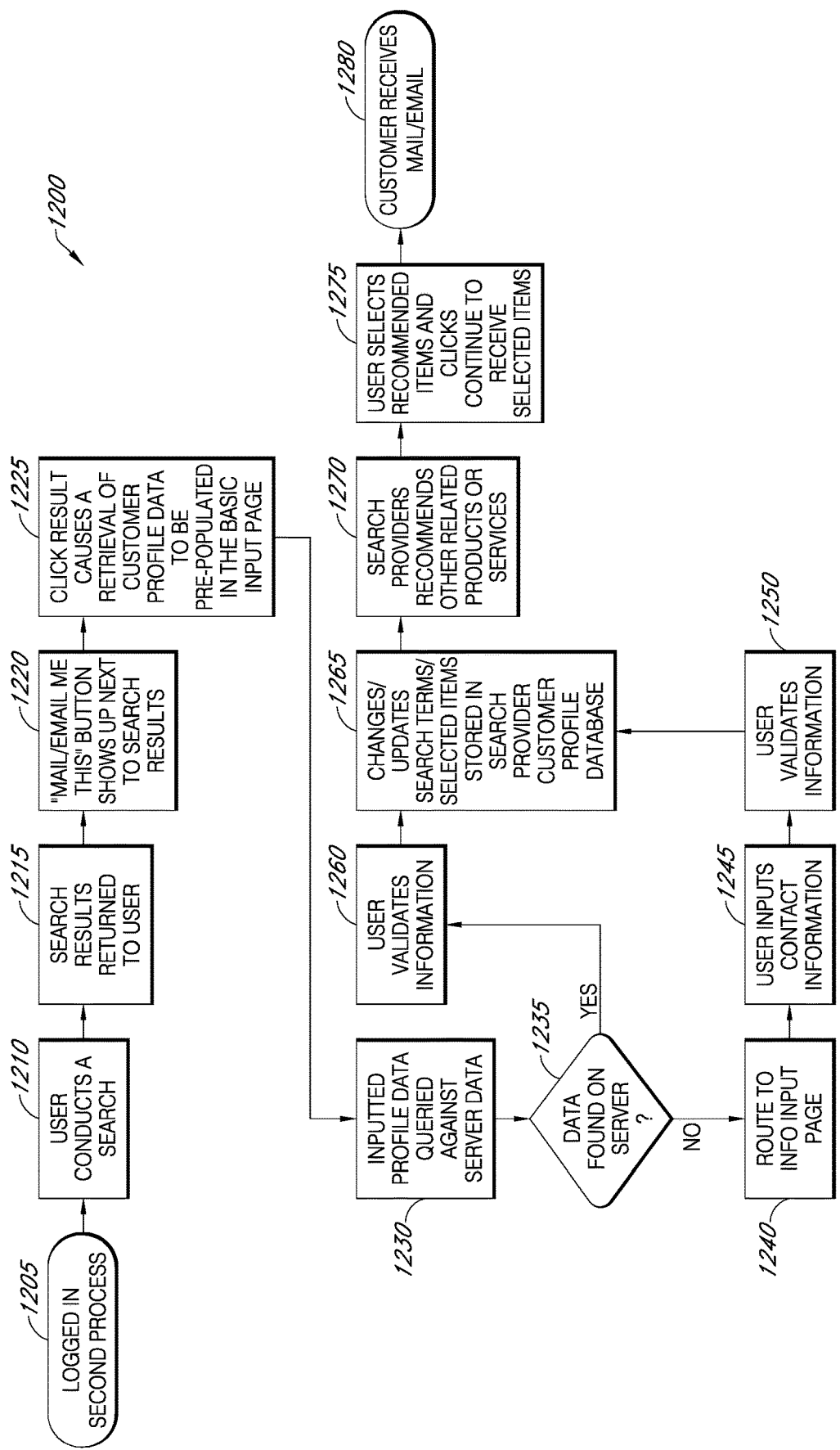
FIG. 12 is a flowchart of an example web application: logged in embodiment using the example system shown in FIG. 6.

Referring to FIG. 12, an example web application process 1200 where the user is logged-in to an application, using an example system such as system 600 shown in FIG. 6, will now be described. The web application process 1200 begins at a step 1205 where the user is logged into the application. Proceeding to a step 1210, the user conducts a search of the web, such as using the provider associated with the application. Continuing at a step 1215, the search results are returned to the user for display on the graphical user interface 512. Advancing to a step 1220, a "mail/email me this" button is displayed next to the relevant search results. Advancing to a step 1225, a click result from selecting one of the "mail/email me this" buttons causes a retrieval of user profile data prepopulated in the basic input page.

At a step 1230, process 1200 causes inputted profile data to be queried against server data in the user profile table 552 of database 551. Moving to a decision step 1235, process 1200 determines if data for the particular user is found on the server. If not, process 1200 moves to a step 1240 so as to route to an information input page for display on the graphical user interface 512. Continuing at a step 1245, the user inputs contact information on the information input page. Then at a step 1250, the user validates the contact information by reviewing the information presented to them and acknowledging the information. However, if the user data was found on the server as determined at the decision step 1235, process 1200 moves to a step 1260 where the user validates the information that has been input. At the completion of step 1250 or of step 1260, process 1200 moves to a step 1265 where changes, updates, search terms or selected items are stored in the search provider's validated user table 553 of user database 551. Moving to a step 1270, the search provider can recommend other related products or services by using known information such as cookies, cache data, social media data, or any other related data at the search provider's disposal. Proceeding to a step 1275, the user can select any of the recommended items and can click a button to receive the selected items.

In certain embodiments, the application processor 542 provides a ready-to-send signal, at least portions of a record from the validated user table 553 for a particular user, an identifier and/or location of the information/products/material for sending to the user to the service provider 570 and/or mailer 580. The service provider and/or mailer 580 utilize the data provided from the application processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the validated record for the particular user. Subsequently, the desired information or material is received by the user via mail or email or other way at a step 1280.

Figure 13:
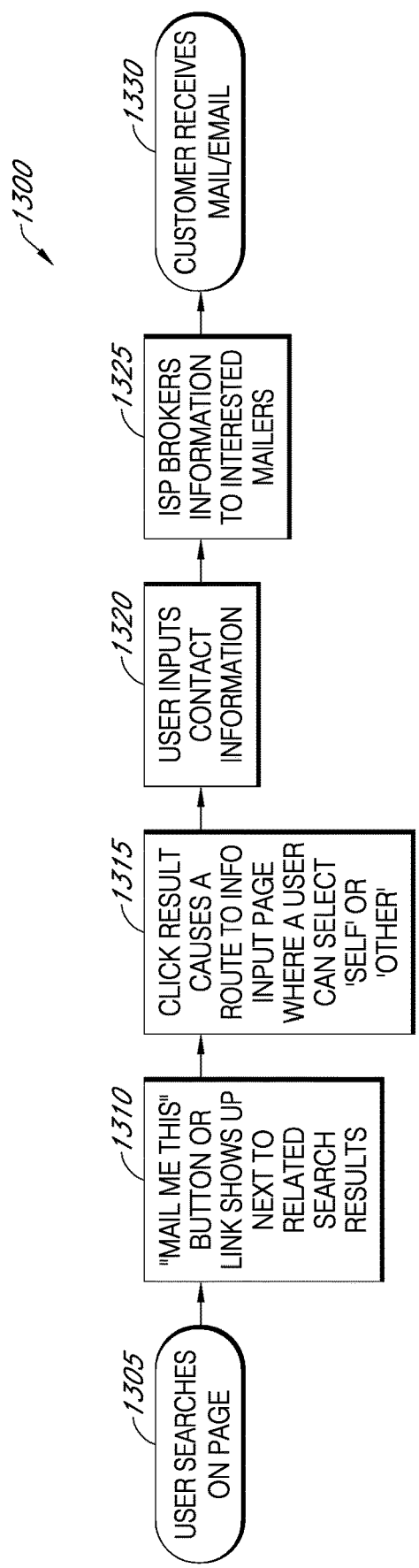
FIG. 13 is a flowchart of an example web application: non-logged in embodiment using the example system shown in FIG. 6.

Referring to FIG. 13, an example web application process 1300 where the user is not logged-in to an application, using an example system such as system 600 shown in FIG. 6, will now be described. The web application process 1300 begins at a step 1305 where the user is not logged into the application, but conducts a search on the page of the application. Proceeding to a step 1310, a "mail me this" button or link is displayed next to the related search results on the graphical user interface 512. Advancing to a step 1315, a click result on a selected one of the buttons/links causes an information input page where the user can select themselves or a third party. Continuing at a step 1320, the user inputs contact information regarding either themselves or the third party.

In certain embodiments, the application processor 542 provides a ready-to-send signal, at least portions of the input contact information, an identifier and/or location of the selected information/products/material for sending to the user or third party to the service provider 570 and/or mailer 580. The service provider and/or mailer 580 utilize the data provided from the application processor to initiate a delivery 582 to the user or third party. In certain embodiments, for example, the service provider and/or mailer can initiate, upon receipt of the signal, the identifier and/or location, automatically packaging the desired material, e.g., a sample, applying postage and initiating a mailing to the user using portions of the validated record for the particular user.

Subsequently, the desired information or material is received by the user or third party via mail or email or other way at a step 1330. In certain embodiments, the service provider acts as an intermediary to establish agreements for relationships with one or more mailers, which are then utilized in the implementation and processing of the mailings to various users of the system and method. In other embodiments, the service provider acts as an intermediary to arrange agreements with interested mailers for the contact information at step 1325.

Figure 14:
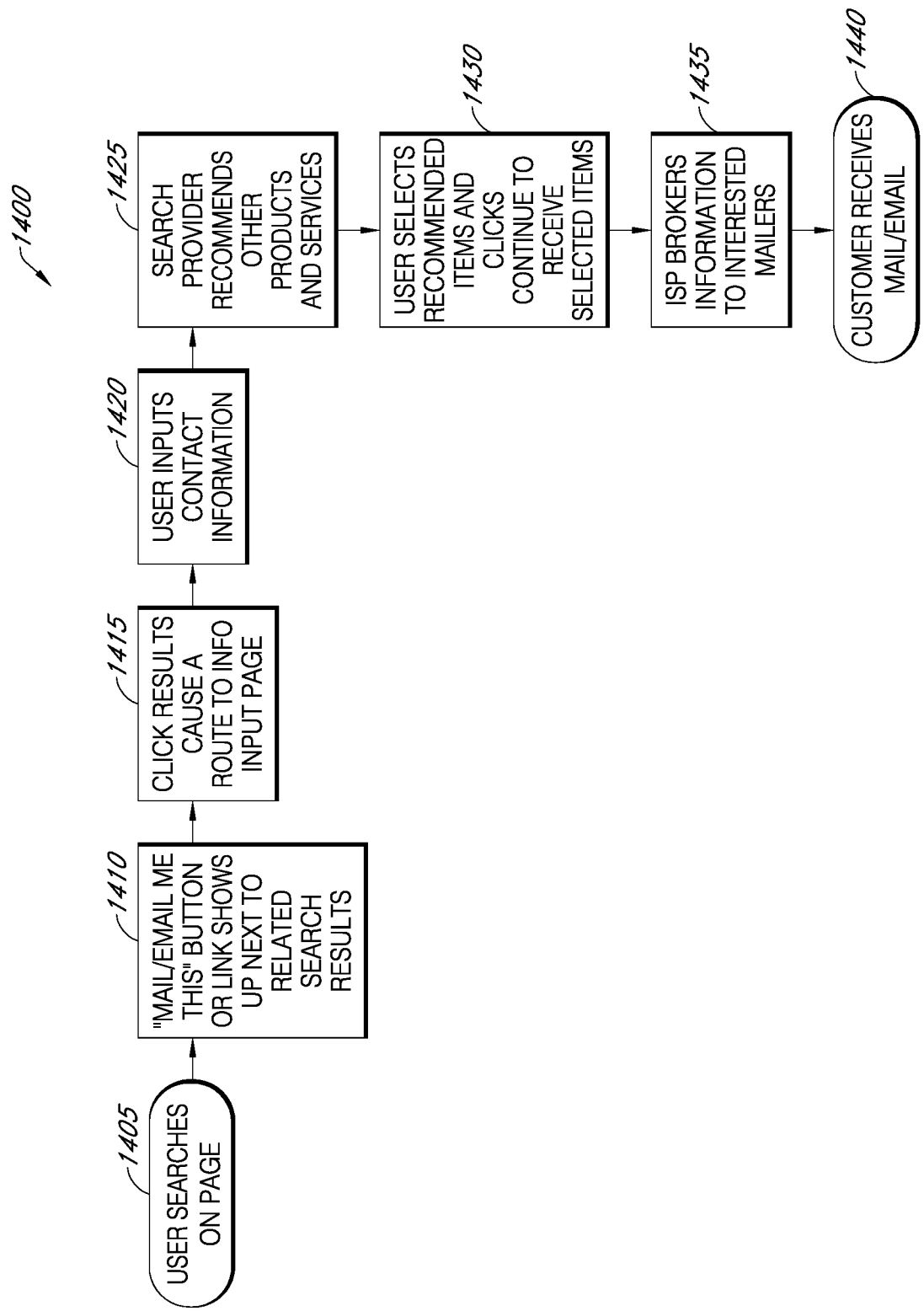
FIG. 14 is a flowchart of another example web application: non-logged in embodiment using the example system shown in FIG. 6.

Referring to FIG. 14, an example web application process 1400 where the user is not logged-in to an application using an example system such as system 600 shown in FIG. 6, will now be described. The web application process 1400 begins at a step 1405 where the user is not logged into the application, but conducts a search on the page of the application. Proceeding to a step 1410, a "mail me this" button or link is displayed next to the related search results on the graphical user interface 512. Advancing to a step 1415, a click result on a selected one of the buttons/links causes a routing to an information input page for the user to complete. Continuing at a step 1420, the user inputs contact information regarding themselves. Moving to a step 1425, the search provider recommends other products and services to the user in the same way as it is done in previously described step 1270. In certain embodiments, the input data is not saved if the user is not logged-in to the application. At step 1430, the user selects one or more recommended items and clicks a button, such as labeled "continue", to receive the selected items.

In certain embodiments, the application processor 542 provides a ready-to-send signal, at least portions of the input contact information, an identifier and/or location of the selected information/products/material for sending to the user to the service provider 570 and/or mailer 580. The service provider and/or mailer 580 utilize the data provided from the application processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the contact information for the particular user.

Subsequently, the desired information or material is received by the user via mail or email or other way at a step 1440. In certain embodiments, the service provider acts as an intermediary to establish agreements for relationships with one or more mailers, which are then utilized in the implementation and processing of the mailings to various users of the system and method. In other embodiments, the service provider acts as an intermediary to arrange agreements with interested mailers for the contact information at step 1435.

Figure 15:
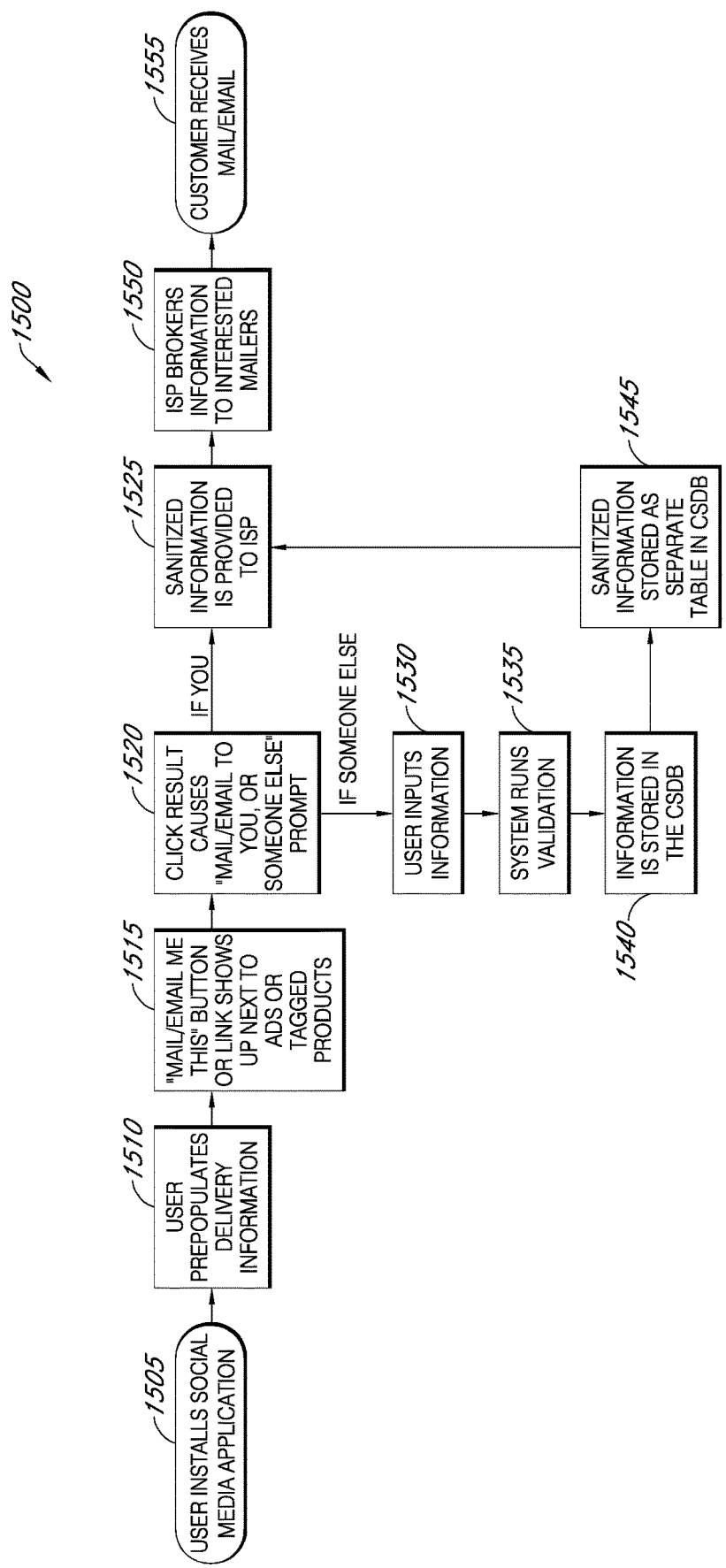
FIG. 15 is a flowchart of an example social media application embodiment using the example USPS system shown in FIG. 7.

Referring to FIG. 15, an example social media application process 1500 where the customer service processing and database(s) are managed by a party, such as the USPS, using an example system such as system 700 shown in FIG. 7 will now be described. The social media application process 1500 begins at a step 1505 where the user installs the social media application if not previously installed. Proceeding to a step 1510, the user prepopulates delivery and contact information through the application. Advancing to a step 1515, a "mail/email me this" button or link is displayed next to ads or tagged products on the graphical user interface 512. This is done with a data structure for each business similar to that shown in FIG. 5. Continuing at a step 1520, a click result on one of the buttons or links on the graphical user interface 512 causes a "mail/email to you, or someone else" prompt from the CSDB processor 544 to be displayed to the user at the graphical user interface 512. If the decision step 1520 result is "to you", a sanitized version of the user's social media application contact data is stored in a sanitized record for the user in table 558 of FIG. 7. If the mail or email is to someone else as determined at step 1520, process 1500 proceeds to a step 1530 where the user inputs information about the third-party. Continuing at a step 1535, the system runs a validation on the input information. In certain embodiments, this validation is done in a similar way to the processing at step 1165, previously described. Proceeding to a step 1540, process 1500 stores the validated information in a database 550 of the customer service processing server 540. The customer service processor 544 utilizes data from the input table 554 of the database 550 for the third-party in a record and produces a record in the data cleansing table 556 as previously described. The data in this record for the user is then used to generate a new record for the third party in the sanitized table 558 as previously described. Moving to step 1545, the sanitized information is stored in the sanitized table 558 by the customer service processor 544.

Advancing to a step 1525 at the completion of step 1545, or if the mail or email is to the user, process 1500, in certain embodiments, provides a ready-to-send signal, at least portions of a record from the sanitized table 558 for a particular user or a third party, an identifier and/or location of the information/material to be sent to the user or a third party to the service provider 570 and/or mailer 580 at a step 1525. The service provider and/or mailer 580 utilize the data provided from the CSDB processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the sanitized record for the particular user or third party.

Subsequently, the desired information or material is received by the user via mail or email or other way at a step 1555. In certain embodiments, the service provider acts as an intermediary to establish agreements for relationships with one or more mailers, which are then utilized in the implementation and processing of the mailings to various users of the system and method. In other embodiments, the service provider acts as an intermediary to arrange agreements with interested mailers for the sanitized user or third party information at step 1550.

Figure 16:
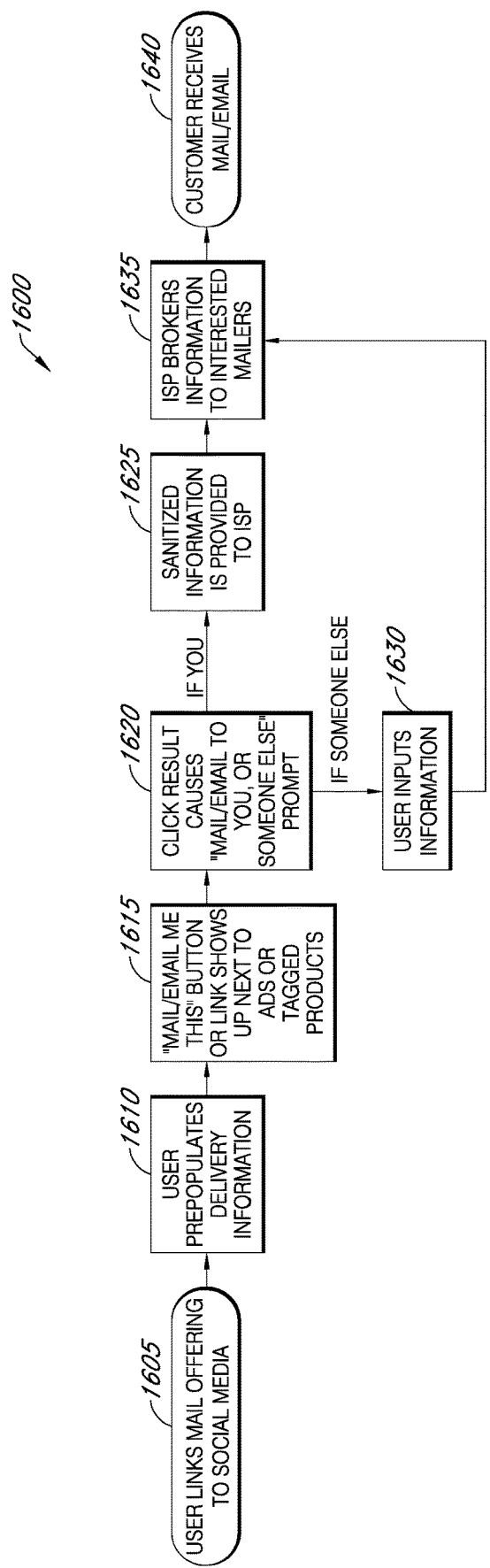
FIG. 16 is a flowchart of an example social media application embodiment using the example non-USPS system shown in FIG. 8.

Referring to FIG. 16, an example social media application process 1500 where the customer service processing and database(s) are managed by a third party using an example system such as system 800 shown in FIG. 8 will now be described. The social media application process 1600 begins at a step 1605 where the user links a mail offering to social media. Proceeding to a step 1610, the user prepopulates delivery and contact information through the application. Advancing to a step 1615, a "mail/email me this" button or link is displayed next to ads or tagged products on the graphical user interface 512. Continuing at a step 1620, a click result on one of the buttons or links on the graphical user interface 512 causes a "mail/email to you, or someone else" prompt to be displayed to the user. If the mail or email is to someone else as determined at step 1620, process 1600 proceeds to a step 1630 where the user inputs information about the third-party. If the decision step 1620 result is "to you", a sanitized version of the user's social media application contact data is stored in a sanitized record for the user in table 558 of FIG. 8. In certain embodiments, the user's social media application contact data is cleansed and sanitized in a similar way as described above.

Advancing to a step 1625 if the mail or email is to the user, process 1600, in certain embodiments, provides a ready-to-send signal, at least portions of a record from the sanitized table 558 for the particular user, an identifier and/or location of the information/material to be sent to the user or a third party to the service provider 570 and/or mailer 580 at step 1625. The service provider and/or mailer 580 utilize the data provided from the database processor to initiate a delivery 582 to the user. In certain embodiments, for example, the service provider and/or mailer can initiate, upon receipt of the signal, the identifier and/or location, automatically packaging the desired material, e.g., a sample, applying postage and initiating a mailing to the user using portions of the sanitized record for the particular user or third party.

Subsequently, the desired information or material is received by the user via mail or email or other way at a step 1640. In certain embodiments, the service provider acts as an intermediary to establish agreements for relationships with one or more mailers, which are then utilized in the implementation and processing of the mailings to various users of the system and method. In other embodiments, the service provider acts as an intermediary to arrange agreements with interested mailers for the user or third party information at step 1635.

Figure 17:
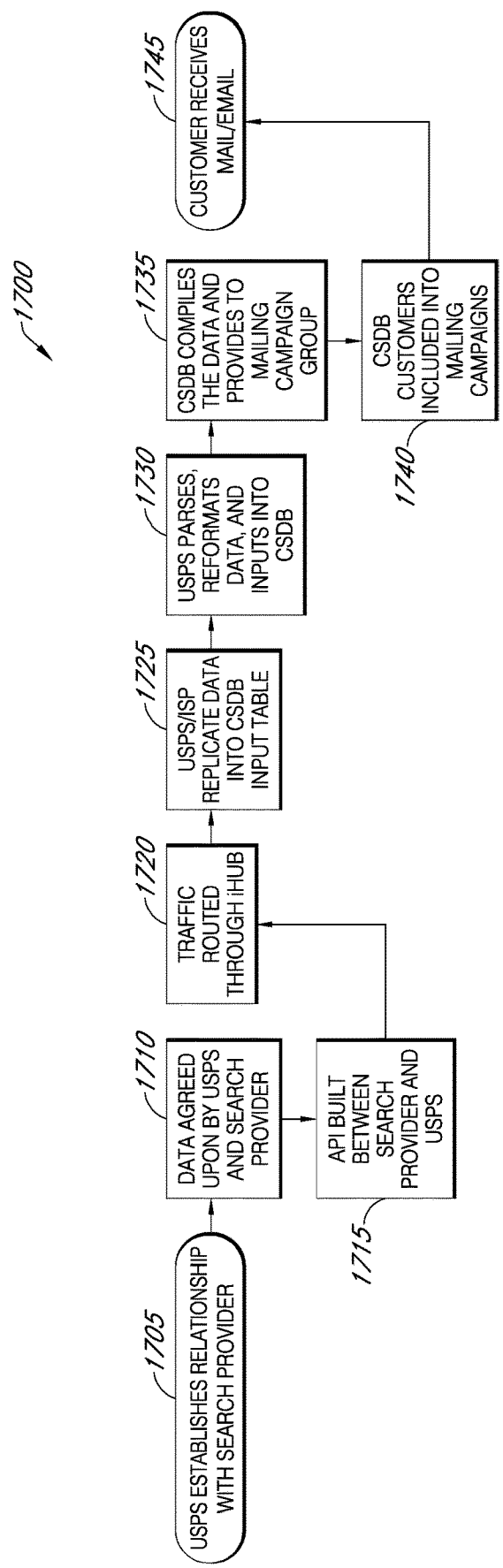
FIG. 17 is a flowchart of an example search API embodiment using the example system shown in FIG. 9.

Referring to FIG. 17, an example search application programming interface process 1700 where the customer service processing and database(s) are managed by an entity, such as the USPS for example, using an example system such as system 900 shown in FIG. 9 will now be described. The search application programming interface process 1700 begins at a step 1705 where the USPS or other customer service provider establishes a relationship with a search provider such as search provider 530. Proceeding to a step 1710, agreement is made regarding data and data formats between the customer service provider and the search provider. Continuing at a step 1715, an application programming interface is built between the search provider and the customer service provider (e.g., USPS). Proceeding to a step 1720, process 1700 routes traffic through the iHub or network hub 520. Advancing to a step 1725, the customer service provider and the network service provider replicate data in the customer service processing database 550 into the input table 554. Proceeding to a step 1730 the customer service provider processor 544 parses, reformats data and inputs it into the database 550. This process includes data transformation activities such as reformatting inputted data to fit within the parameters of the database. In certain embodiments, a sanitizing operation is performed and the sanitized information is stored in the sanitized table 558 of database 550.

Continuing to a step 1735, the customer service processor 544 compiles the data and provides it to the mailing campaign group 571. In certain embodiments, the CSDB processor 544 provides a ready-to-send signal, at least portions of a record from the database 550 for a particular user, an identifier and/or location of the information/material to be sent to the user to the mailing campaign group 571 and/or mailer 580 at step 1735. The mailing campaign group 571 and/or mailer 580 utilize the data provided from the CSDB processor to initiate a delivery 582 in a mailing campaign, for example, to the user at step 1740. In certain embodiments, for example, the mailing campaign group and/or mailer can initiate, upon receipt of the signal, the identifier and/or location, automatically packaging the desired material, e.g., a sample, applying postage and initiating a mailing to the user using portions of the record for the particular user. Subsequently, the desired information or material is received by the user via mail or email or other way at a step 1745.

Figure 18:
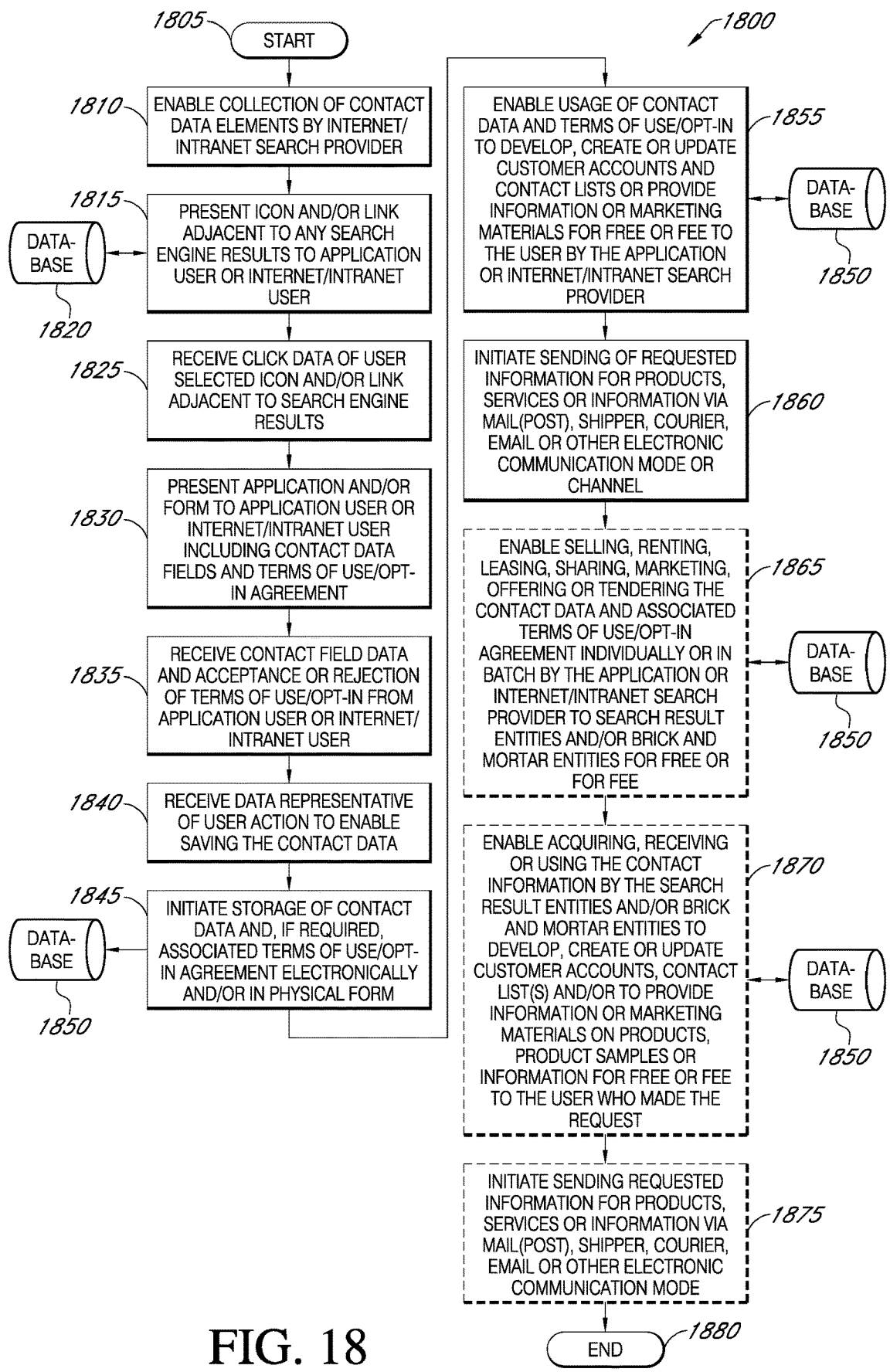
FIG. 18 is a flowchart of an example search provider embodiment of the system and method.

Referring to FIG. 18, another example embodiment of a process 1800 for a native application operating on the system 500, for example will be described. In certain embodiments, process 1800 can be performed on the system 500 shown in FIG. 5.

Beginning at a start state 1805, process 1800 enables collection of contact data elements by an internet/intranet search provider at step 1810. Advancing to step 1815, process 1800 presents an icon and/or link adjacent to any search engine results to an application user or an internet/intranet user while accessing a database 1820, which may correspond to database 560 of FIG. 5, for example. Database 1820 may have records for businesses utilizing the features of the system and method, where the records can include a keywords field, a link and/or icon field for the link and/or icon to be displayed with search results matching the keyword(s), a material(s) and/or information field to be provided to the user and a delivery field indicative of how the material(s)/information is to be provided to the user.

Proceeding to step 1825, the process 1800 receives click data of a particular user selected icon and/or link adjacent to the search engine results. Continuing to a step 1830, process 1800 presents the application and/or form to the application user or internet/intranet user including contact data fields and a terms of use/opt-in agreement. Advancing to step 1835, process 1800 receives the contact field data and acceptance or rejection of the terms of use/opt-in from the application user or internet/intranet user. Moving to step 1840, process 1800 receives data representative of a user action, e.g., clicking a button, to enable saving the contact data. Proceeding to a step 1845, process 1800 initiates storage of the contact data and, if required, associated terms of use/opt-in agreement electronically and/or in physical form. The data can be stored in a database 1850 which may correspond to database 550 of FIG. 5, for example, where each record has a plurality of data fields for the particular user using the system.

Continuing to a step 1855, process 1800 enables usage of contact data and terms of use/opt-in to develop, create or update user accounts and contact lists or provide information or materials for free or fee to the user by the application or internet/intranet search provider, which can include accessing the database 1850 to obtain the desired data. Advancing to a step 1860, process 1800 initiates sending of the requested information for products, services or information via mail (post), shipper, courier, email or other electronic communication mode or channel. Proceeding to an optional step 1865, process 1800 enables selling, renting, leasing, sharing, marketing, offering or tendering the contact data and associated terms of the use/opt-in agreement individually or in a batch by the application or internet/intranet search provider to search result entities and/or business entities with a physical storefront for free or for fee, which can include accessing the database 1850 to obtain the desired data. Moving to an optional step 1870, process 1800 enables acquiring, receiving or using the contact information by the search result entities and/or business entities with a physical storefront to develop, create or update user accounts, contact list(s) and/or to provide information or marketing materials on products, product samples or information for free or fee to the user who made the request, which can include accessing the database 1850 to obtain the desired data. Proceeding to an optional step 1875, process 1800 initiates sending the requested information for products, services or information via mail (post), shipper, courier, email or other electronic communication mode. Process 1800 completes at an end state 1880.

Figure 19:
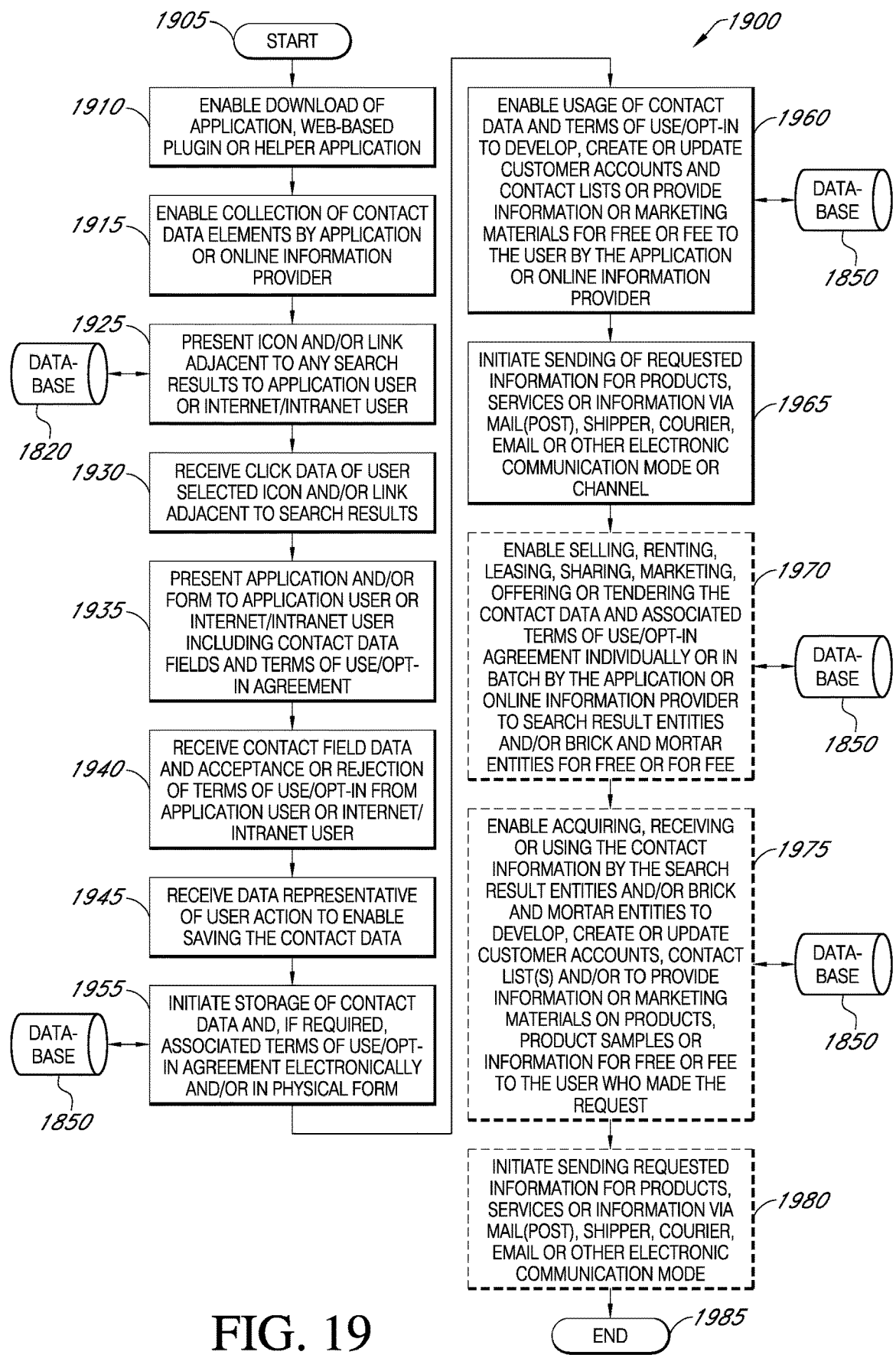
FIG. 19 is a flowchart of an example application or online information provider embodiment of the system and method.

Referring to FIG. 19, another embodiment of a process 1900 for a native application operating on system 500 shown in FIG. 5, for example, will be described.

Beginning at a start state 1905, process 1900 enables a download of an application, web-based plugin or helper application at step 1910. Advancing to a step 1915, process 1900 enables the collection of contact data elements by the application or online information provider. Continuing to a step 1925, process 1900 presents an icon and/or link adjacent to any search engine results to an application user or an internet/intranet user while accessing a database 1820, which may correspond to database 560 of FIG. 5, for example. Database 1820 may have records for businesses utilizing the features of the system and method, where the records can include a keywords field, a link and/or icon field for the link and/or icon to be displayed with search results matching the keyword(s), a material(s) and/or information field to be provided to the user and a delivery field indicative of how the material(s)/information is to be provided to the user.

Proceeding to a step 1930, the process 1900 receives click data of a particular user selected icon and/or link adjacent to the search engine results. Continuing to a step 1935, process 1900 presents the application and/or form to the application user or internet/intranet user including contact data fields and a terms of use/opt-in agreement. Advancing to step 1940, process 1900 receives the contact field data and acceptance or rejection of the terms of use/opt-in from the application user or internet/intranet user. Moving to step 1945, process 1900 receives data representative of a user action, e.g., clicking a button, to enable saving the contact data. Proceeding to a step 1955, process 1900 initiates storage of the contact data and, if required, associated terms of use/opt-in agreement electronically and/or in physical form. The data can be stored in a database 1850 which may correspond to database 550 of FIG. 5, for example, where each record has a plurality of data fields for the particular user using the system.

Continuing to a step 1960, process 1900 enables usage of contact data and terms of use/opt-in to develop, create or update user accounts and contact lists or provide information or materials for free or fee to the user by the application or internet/intranet search provider, which can include accessing the database 1850 to obtain the desired data. Advancing to a step 1965, process 1900 initiates sending of the requested information for products, services or information via mail (post), shipper, courier, email or other electronic communication mode or channel. Proceeding to an optional step 1970, process 1900 enables selling, renting, leasing, sharing, marketing, offering or tendering the contact data and associated terms of use/opt-in agreement individually or in batch by the application or online information provider to search result entities and/or business entities with a physical storefront entities for free or for fee, which can include accessing the database 1850 to obtain the desired data. Moving to an optional step 1975, process 1900 enables acquiring, receiving or using the contact information by the search result entities and/or business entities with a physical storefront to develop, create or update user accounts, contact list(s) and/or to provide information or marketing materials on products, product samples or information for free or fee to the user who made the request, which can include accessing the database 1850 to obtain the desired data. Proceeding to an optional step 1980, process 1900 initiates sending the requested information for products, services or information via mail (post), shipper, courier, email or other electronic communication mode. Process 1900 completes at an end state 1985.

Conclusion

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of providing an item, the method comprising:
   receiving, at a server via a network, a data structure from a first entity, wherein the data structure maps selected keyword combinations to corresponding icons and/or links, and to particular information or material corresponding to each keyword combination;
   presenting one or more icons and/or links associated with user-initiated results having at least a portion of corresponding selected keywords using the data structure, wherein the icons and/or links are displayed adjacent to associated user-initiated result items on an electronic display of a computing device corresponding to a particular user;
   storing contact data of the particular user in a record of an initial table of an electronic memory;
   transforming data in at least one or more fields of the record for the particular user in the initial table to generate a record for the particular user in a sanitized table of the electronic memory; and
   causing the sending of particular material received from the first entity, the particular material corresponding to the user-initiated results using a user selected icon and/or link and contact data for the particular user obtained from the sanitized table.

2. The method of claim 1, wherein the sending comprises sending physical material.

3. The method of claim 1, wherein the sending comprises sending the particular information via email or other electronic communication mode or channel.

4. The method of claim 1, additionally comprising:
   requesting a product or service or information rating preference of the particular user;
   receiving the product or service or information rating preference from the particular user; and
   storing the product or service or information rating preference in the record corresponding to the particular user in the sanitized table.

5. The method of claim 1, additionally comprising:
   presenting terms of use and an opt-in agreement to the particular user;
   receiving an acceptance or denial of the terms of use and the opt-in agreement from the particular user; and
   storing the acceptance or denial of the terms of use and the opt-in agreement in the record corresponding to the particular user in the sanitized table.

6. The method of claim 1, wherein the contact data comprises a social network identification, a social network name or a social network name alias.

7. The method of claim 1, wherein the user-initiated results include search engine results, web page results or memory resident application results.

8. The method of claim 1, wherein initiating the sending of the particular material corresponding to the user-initiated results based on the user selected icon and/or link comprises accessing the data structure corresponding to the user selected icon and/or link and performing a look-up in the data structure for the at least a portion of the keywords to identify the corresponding material.

9. The method of claim 1, wherein the particular material that is sent comprises material on products, services or information, product or service samples for free or for a fee.

10. The method of claim 1, additionally comprising, in parallel with causing the sending, displaying a web page based on the user selected icon and/or link displayed adjacent to associated search result item on the electronic display of the computing device corresponding to the particular user.

11. The method of claim 1, wherein data obtained from the record for the particular user in the sanitized table has been tokenized to replace certain information for security.

12. A method of providing material based on a user-initiated request in a system including at least a computing device, a server, a network and at least one electronic memory, the method comprising:
   accessing a first electronic memory having previously stored contact information for a user in a record of an initial table of a first electronic memory;
   transforming data in at least one or more fields of the record for the user in the initial table to generate a record for the user in a sanitized table of the first electronic memory;
   accessing a second electronic memory having a previously stored data structure from a first entity, wherein the data structure maps selected keyword combinations to corresponding icons and/or links, and to particular material corresponding to each keyword combination;
   presenting one or more icons and/or links associated with user-initiated results having at least a portion of corresponding identified keywords in the user record, wherein the icons and/or links are displayed with the associated user-initiated results on an electronic display of a computing device corresponding to the user; and
   causing the sending of the particular material received from the first entity, the particular material corresponding to the user-initiated request based on a user selected icon and/or link and contact data for the user obtained from the sanitized table.

13. The method of claim 12, wherein the sending comprises sending physical material.

14. The method of claim 12, additionally comprising:
obtaining missing contact data and/or a terms of use agreement at least partially established and an opt-in agreement from the user; and
storing the obtained contact data and/or the terms of use and the opt-in agreement in the record for the user of the initial table in the first electronic memory.

15. The method of claim 12, wherein the contact data comprises a social network identification, a social network name or a social network name alias.

16. The method of claim 12, wherein causing the sending of the material corresponding to the user-initiated request based on the user selected icon and/or link comprises accessing the data structure corresponding to the user selected icon and/or link and performing a look-up in the data structure for the at least a portion of the keywords to identify the corresponding material.

17. The method of claim 12, wherein the particular material that is sent comprises material on products, services or information, product or service samples for free or for a fee.

18. The method of claim 12, additionally comprising, in parallel with initiating the sending, displaying a web page based on the user selected icon and/or link displayed adjacent to the associated user-initiated results on the electronic display of the computing device corresponding to the user.

19. The method of claim 12, additionally comprising:
presenting an application or form on the electronic display of the computing device corresponding to the user to request the contact information of the user;
receiving the contact information of the user; and
storing the contact data in the record for the user of the initial table of the first electronic memory.

20. The method of claim 12, wherein data obtained from the record for the particular user in the sanitized table has been tokenized to replace certain information for security.

* * * * *